United States Patent
Evans et al.

(10) Patent No.: US 10,063,559 B2
(45) Date of Patent: Aug. 28, 2018

(54) SHARING CONTENT IN SOCIAL NETWORKS

(71) Applicant: Van Azul Media, LLC, Woodbury, NY (US)

(72) Inventors: Gary Evans, Decatur, GA (US); Elliott Rothman, Atlanta, GA (US); Mason Forrest Hugus, Atlanta, GA (US); Matt Cohen, New York, NY (US)

(73) Assignee: Van Azul Media, LLC, Woodbury, NY (US)

( * ) Notice: Subject to any disclaimer, the term of this patent is extended or adjusted under 35 U.S.C. 154(b) by 0 days.

(21) Appl. No.: 15/054,433

(22) Filed: Feb. 26, 2016

(65) Prior Publication Data

US 2016/0255091 A1    Sep. 1, 2016

Related U.S. Application Data

(63) Continuation of application No. 14/177,929, filed on Feb. 11, 2014, now abandoned.
(Continued)

(51) Int. Cl.
*G06F 15/16* (2006.01)
*H04L 29/06* (2006.01)
(Continued)

(52) U.S. Cl.
CPC ........ *H04L 63/102* (2013.01); *G06F 17/3028* (2013.01); *G06F 17/30867* (2013.01);
(Continued)

(58) Field of Classification Search
None
See application file for complete search history.

(56) References Cited

U.S. PATENT DOCUMENTS 7,778,973 B2 *   8/2010   Choi ................. G06F 17/30274
                                                            707/628
7,853,881 B1 *  12/2010   Aly Assal ..................... 715/734
(Continued)

OTHER PUBLICATIONS

Video Removed From YouTube (Bianca Bosker, originally posted on Jun. 16, 2011, screen capture from Jun. 18, 2011, The Huffington Post, https://web.archive.org/web/20110618174043/http://www.huffingtonpost.com/2011/06/16/rebecca-black-friday-video-removed_n_878333.html).*
Share on Facebook (Hooper, Gareth. "Share on Facebook—Customizing the Text and Images That Are Posted When Your Web Pages Are." Gareth Hooper's Blog, Apr. 3, 2010)—https://gareth-hooper.com/2010/04/03/share-on-facebook-customizing-the-text-and-images-that-are-posted-when-your-web-pages-are-shared-on-facebook/.*
(Continued)

*Primary Examiner* — Umar Cheema
*Assistant Examiner* — Gregory P Tolchinsky
(74) *Attorney, Agent, or Firm* — Taylor English Duma LLP

(57) ABSTRACT

The present disclosure relates to systems, methods, and software for sharing content in social networks. A request from a user of the social network to share content is received, the request comprising the content and at least one sharing parameter. A command is sent to the social network on behalf of the user to cause the content to be published to a profile related to the user on the social network, the command comprising an URL associated with the content. Requests to retrieve the content may then be received from the social network, the requests comprising the URL associated with the content. When requests to retrieve the content are received, it is determined whether the content is authorized for viewing based on the at least one sharing parameter. If the content is authorized for viewing, the content is returned in response to the request.

16 Claims, 33 Drawing Sheets

Related U.S. Application Data

(60) Provisional application No. 61/763,800, filed on Feb. 12, 2013, provisional application No. 61/764,364, filed on Feb. 13, 2013, provisional application No. 61/834,950, filed on Jun. 14, 2013.

(51) Int. Cl.
*G06Q 50/00* (2012.01)
*G06F 17/30* (2006.01)

(52) U.S. Cl.
CPC ....... *G06F 17/30887* (2013.01); *G06Q 50/01* (2013.01); *G06F 2221/0724* (2013.01)

(56) References Cited

U.S. PATENT DOCUMENTS

| | | | | |
|---|---|---|---|---|
| 7,886,334 | B1* | 2/2011 | Walsh | G06Q 10/00 713/166 |
| 8,862,894 | B2* | 10/2014 | Hoffman | G06F 21/6218 705/908 |
| 2010/0050090 | A1* | 2/2010 | Leebow | G06F 3/048 715/751 |
| 2012/0124479 | A1 | 5/2012 | Morin et al. | |
| 2012/0173356 | A1* | 7/2012 | Fan | G06Q 10/101 705/26.1 |
| 2013/0304802 | A1* | 11/2013 | Assadollahi | G06F 17/30867 709/203 |

OTHER PUBLICATIONS

OAuth (Ko, Moo Nam, Gorrell P. Cheek, Mohamed Shehab, and Ravi Sandhu. "Social-Networks Connect Services." IEEE Computer Society (2010): 37-43. Web)—http://www.profsandhu.com/journals/computer/computer1008.pdf.*

Evans, Gary; U.S. Provisional Patent Application entitled: Sharing Content in Social Networks, having U.S. Appl. No. 61/764,364, filed Feb. 13, 2013, 74 pgs.

Evans, Gary; U.S. Patent Application entitled: Sharing Content in Social Networks, U.S. Appl. No. 14/177,929, filed Feb. 11, 2014; 62 pgs.

Evans, Gary; Non-Final Office Action for U.S. Appl. No. 14/177,929, filed Feb. 11, 2014, dated Aug. 26, 2015, 20 pgs.

Evans, Gary; International Preliminary Report on Patentability for PCT Application No. PCT/US14/15746, filed Feb. 11, 12014, dated Aug. 27, 2015, 8 pgs.

Evans, Gary; International Search Report and Written Opinion for serial No. PCT/US14/15746, filed Feb. 11, 2014, dated Jun. 27, 2014, 9 pgs.

Evans, Gary; PCT Application entitled: Sharing Content in Social Networks, having serial No. PCT/US14/15746, filed Feb. 11, 2014, 63 pgs.

Evans, Gary; U.S. Provisional Patent Application entitled: Sharing Content in Social Networks, having U.S. Appl. No. 61/763,800, filed Feb. 12, 2013, 58 pgs.

Evans, Gary; U.S. Provisional application entitled: Sharing Content in Social Networks, U.S. Appl. No. 61/834,950, filed Jun. 14, 2013; 76 pgs.

* cited by examiner

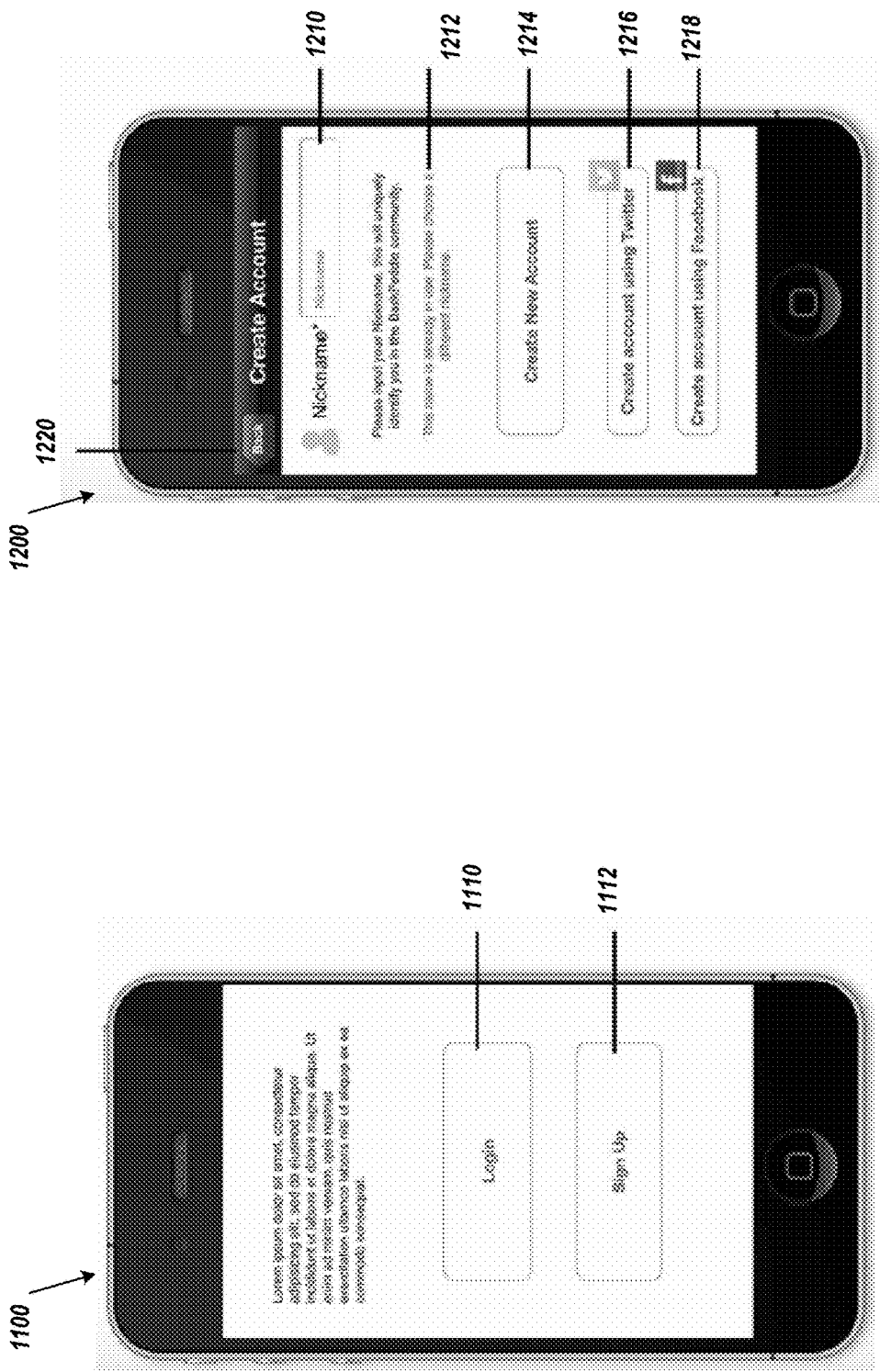

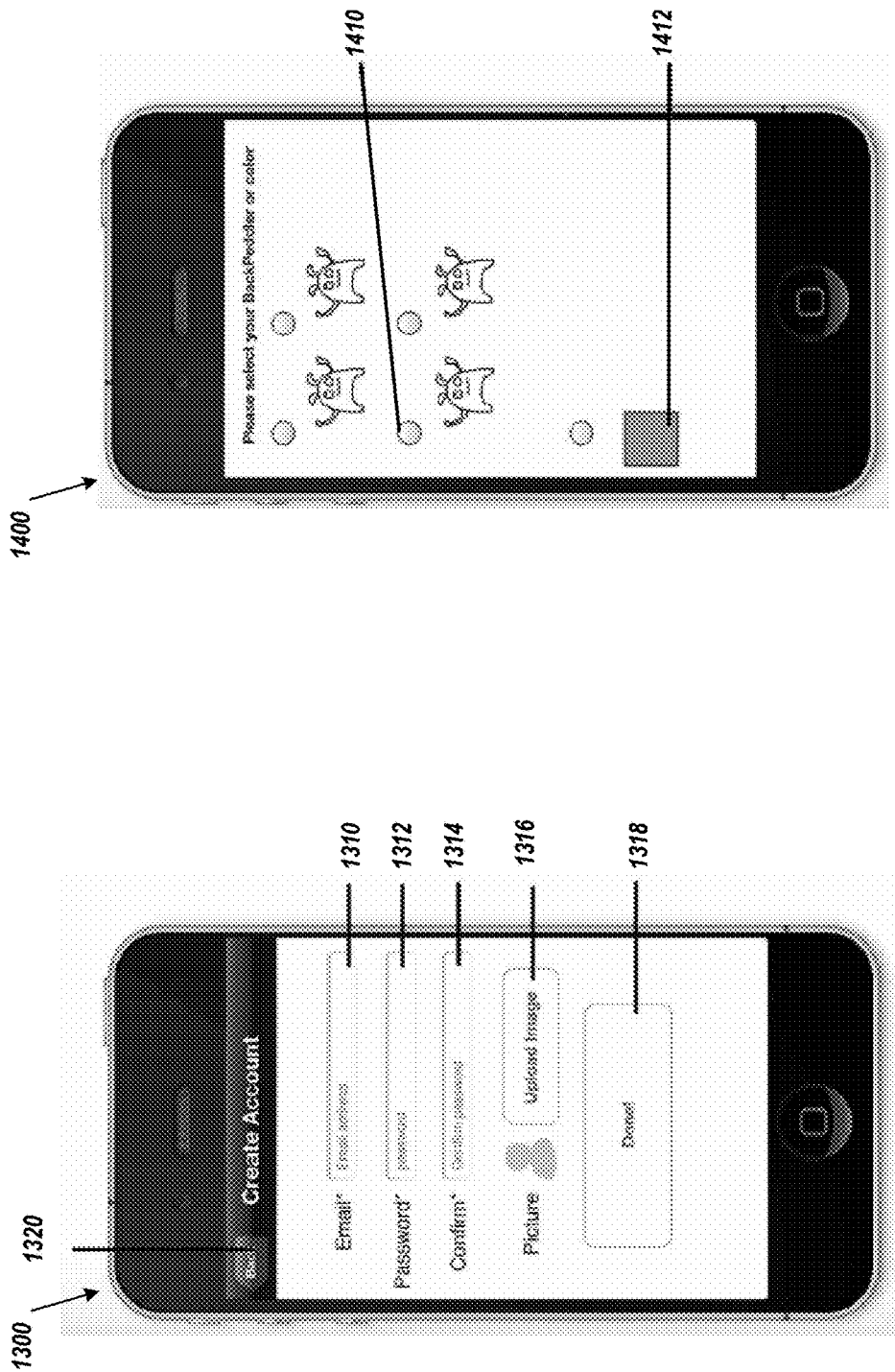

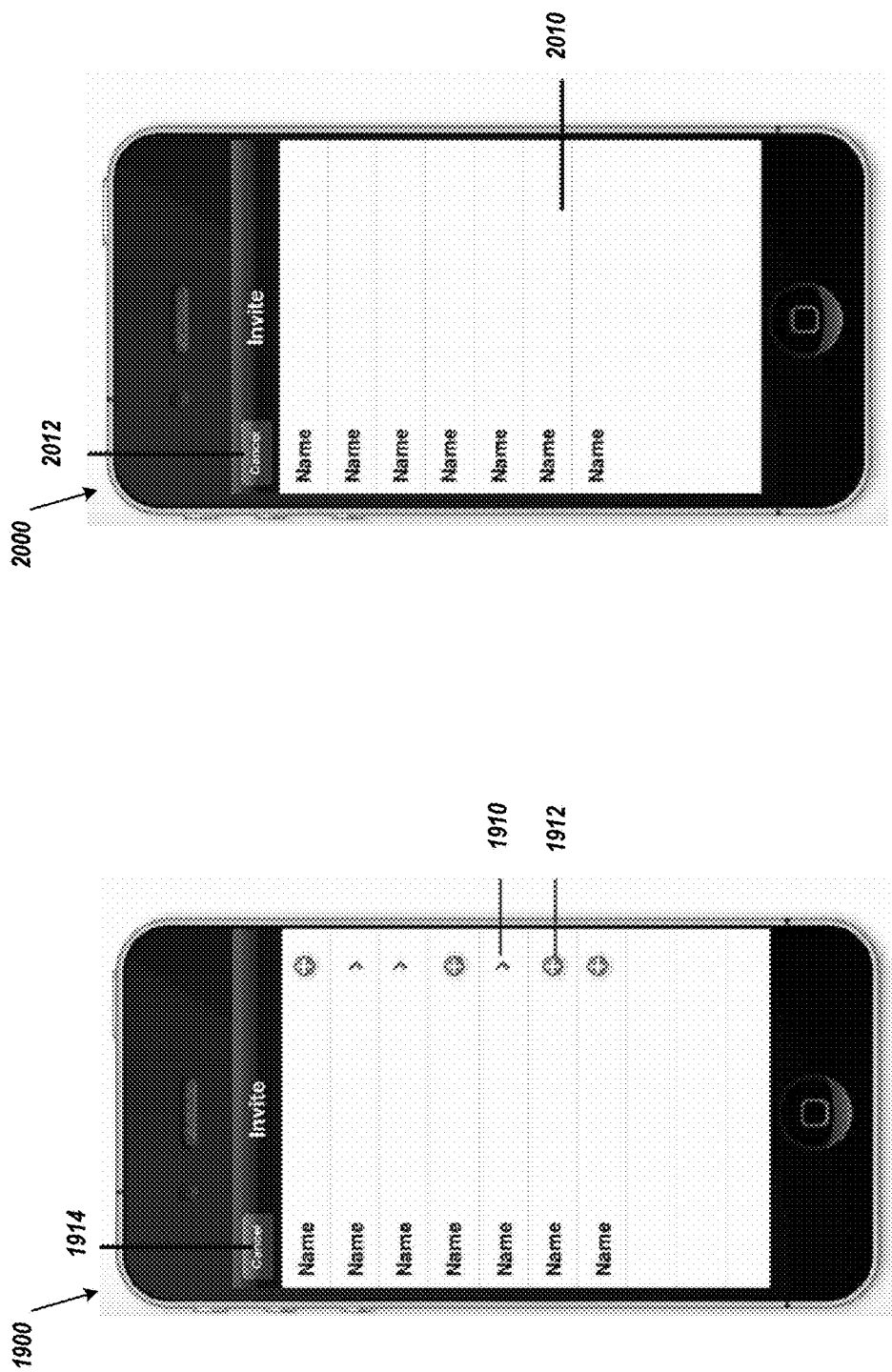

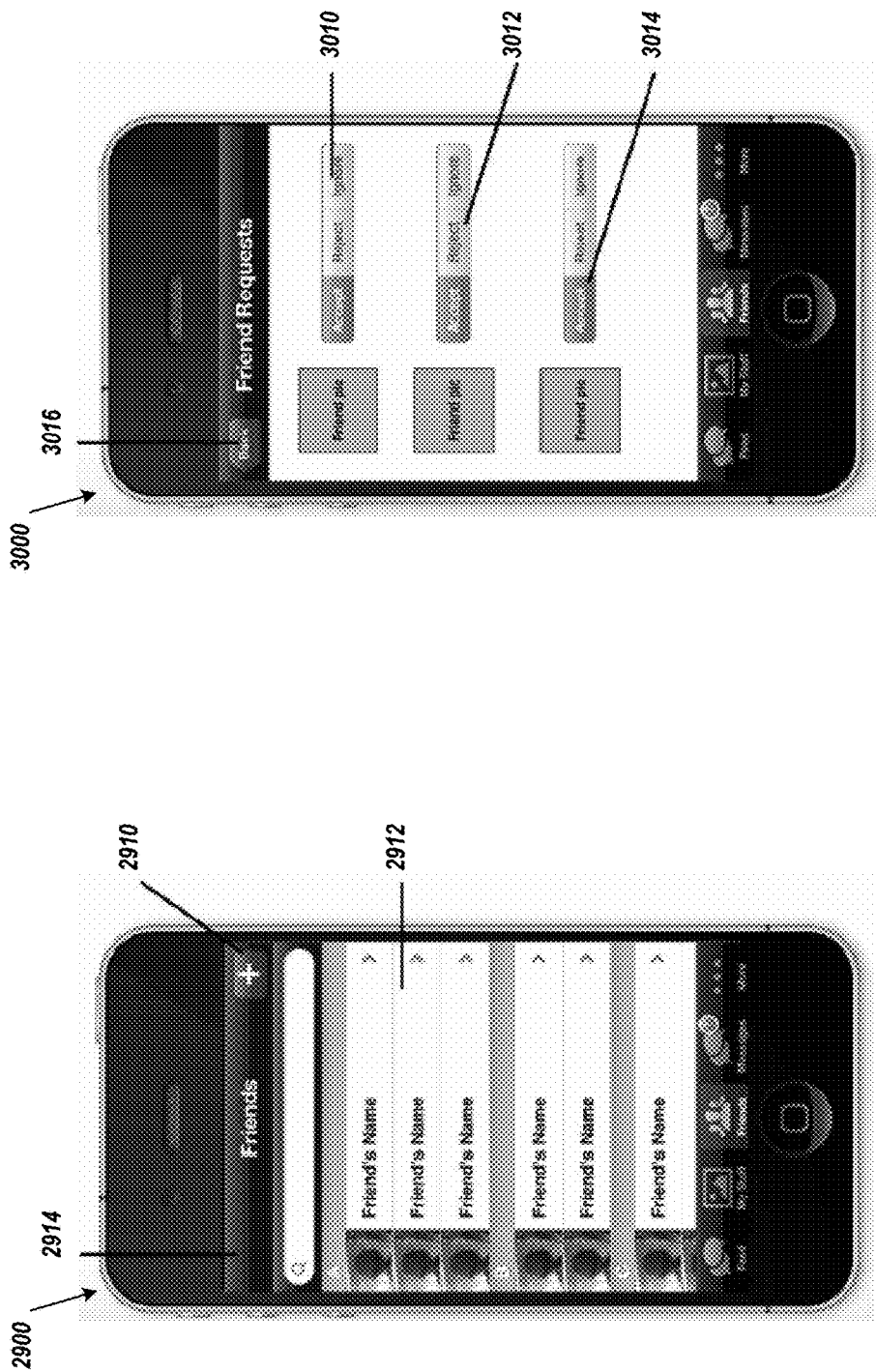

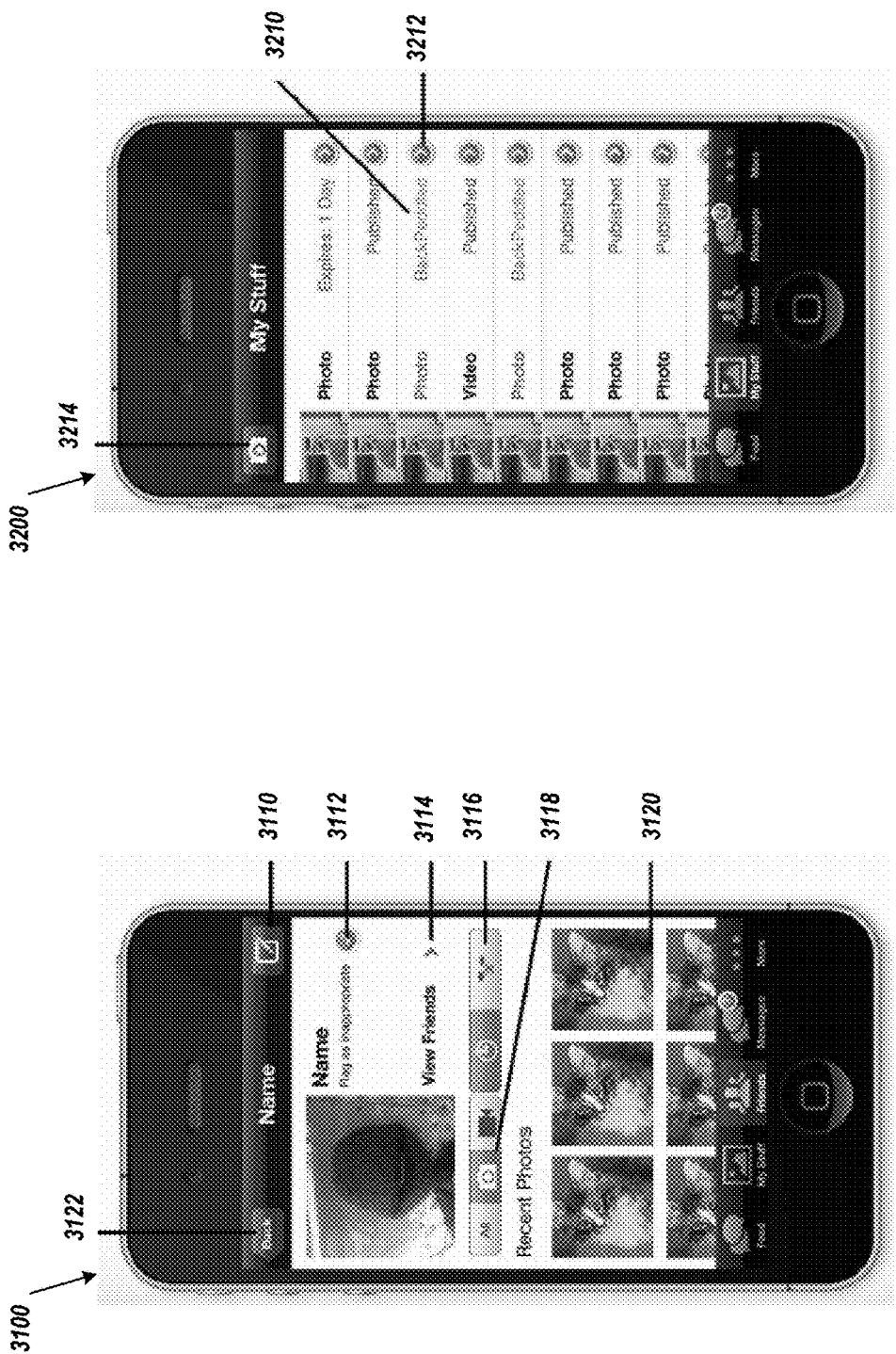

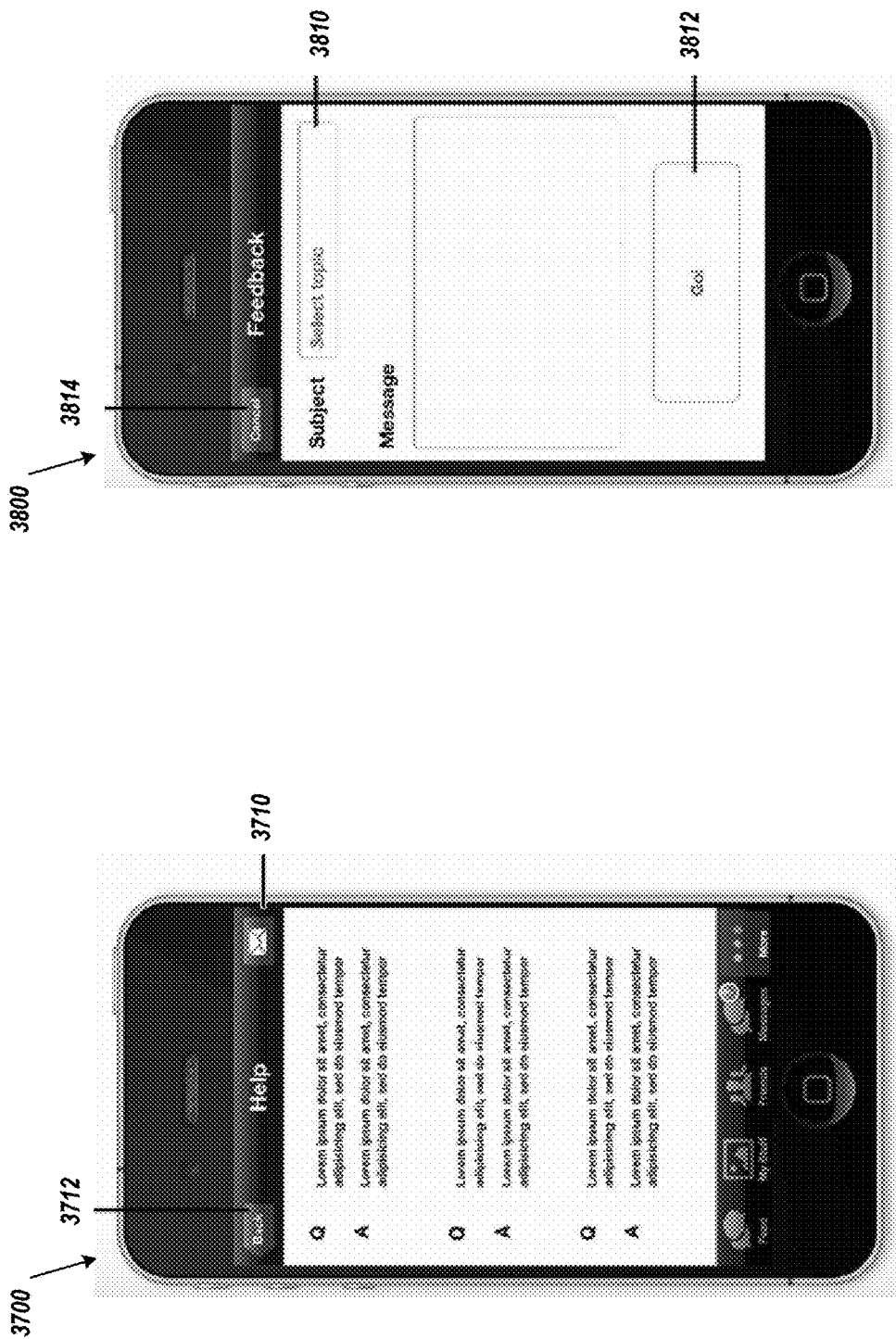

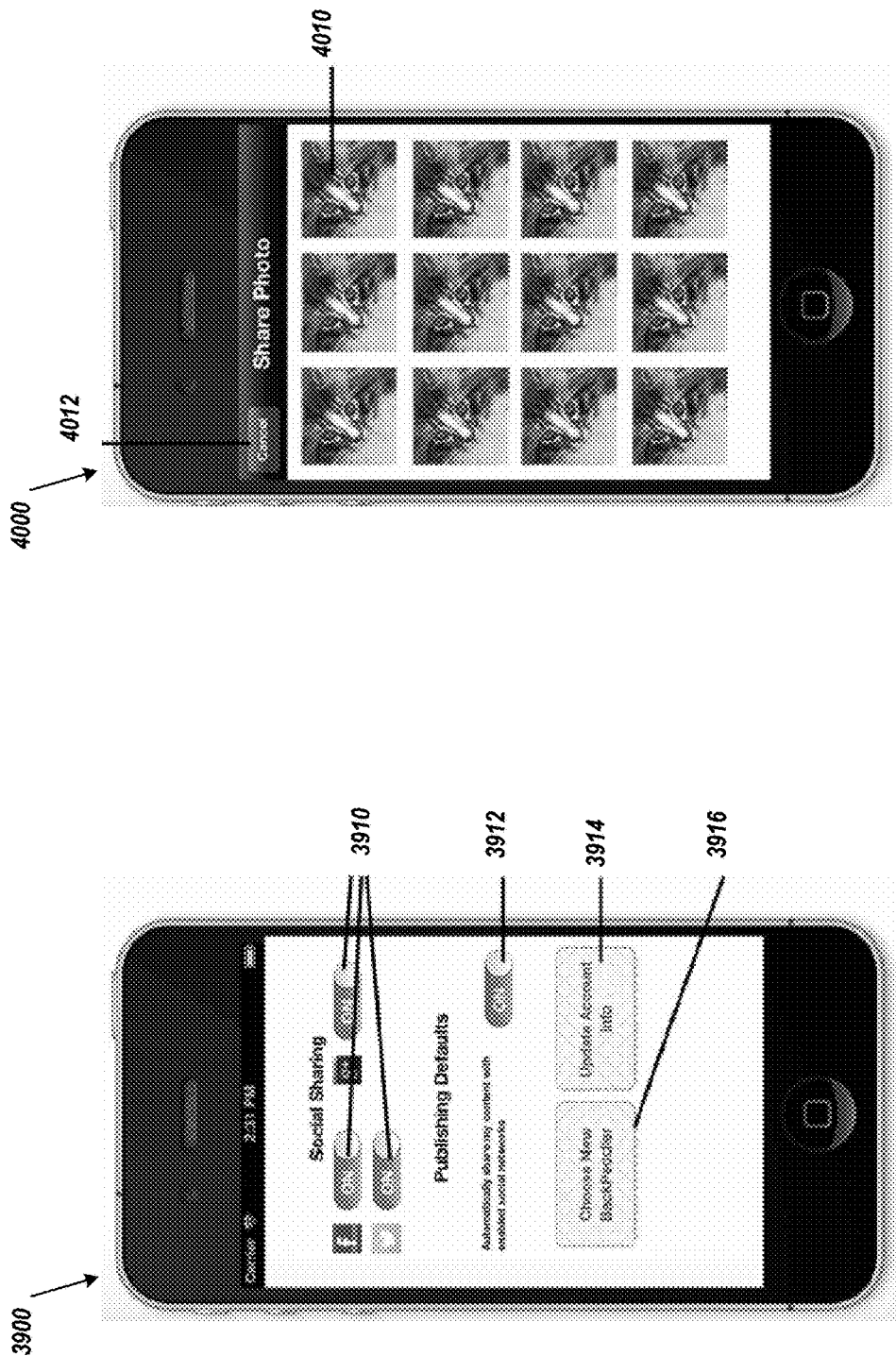

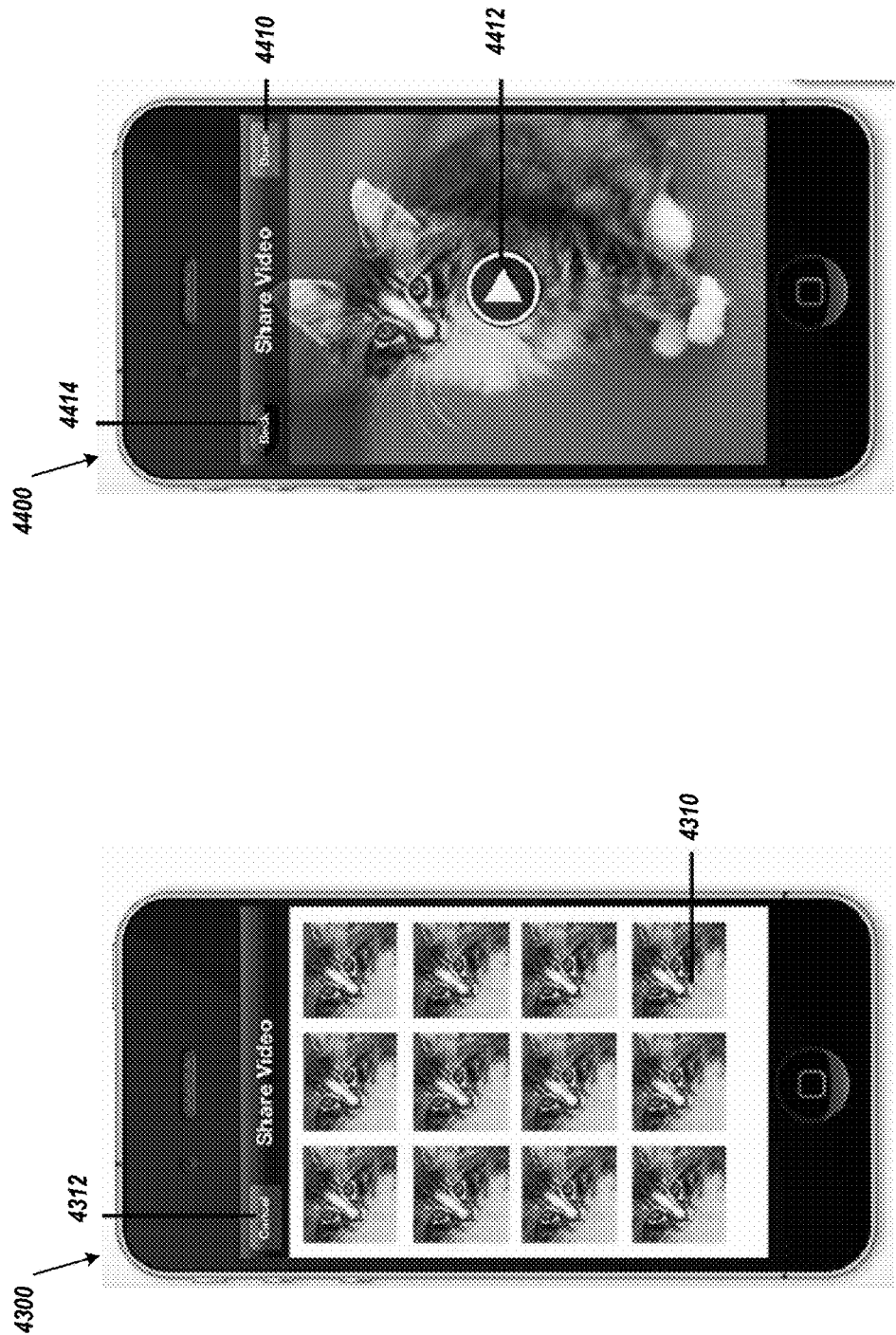

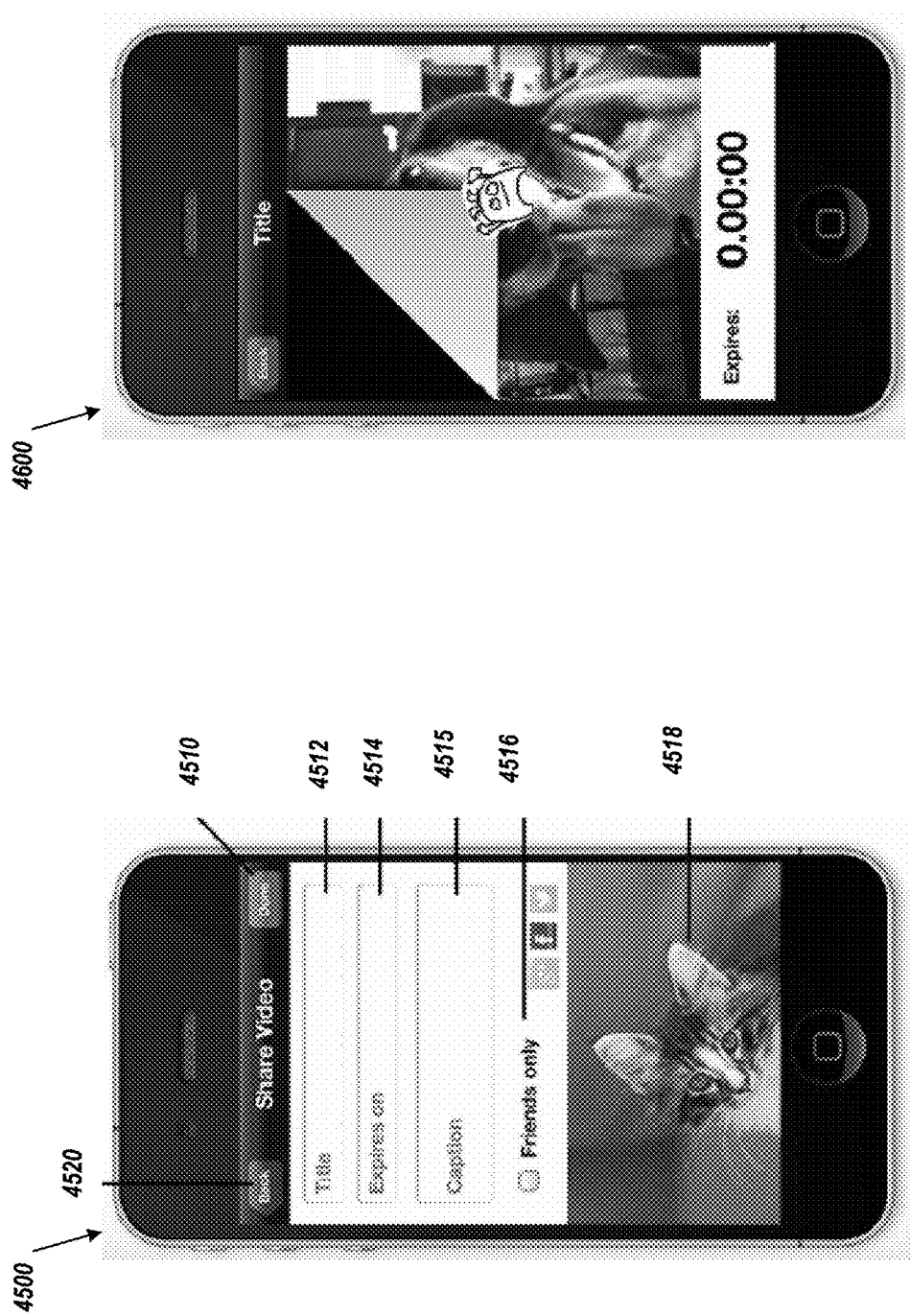

SHARING CONTENT IN SOCIAL NETWORKS

CROSS-REFERENCE TO RELATED APPLICATIONS

This application is a continuation of U.S. application Ser. No. 14/177,929, filed Feb. 11, 2014, and entitled "SHARING CONTENT IN SOCIAL NETWORKS," which claims the benefit of U.S. Provisional Application No. 61/763,800, filed Feb. 12, 2013, U.S. Provisional Application No. 61/764,364, filed Feb. 13, 2013, and U.S. Provisional Application No. 61/834,950, filed Jun. 14, 2013, each entitled "SHARING CONTENT IN SOCIAL NETWORKS," the entire disclosures of which are all hereby incorporated herein by this reference.

SUMMARY

The present disclosure relates to systems, methods, and software for sharing content in social networks. An exemplary method of sharing content in a social network includes receiving a request from a user of the social network to share content, the request comprising the content and at least one sharing parameter. A command is sent to the social network on behalf of the user to cause the content to be published to a profile related to the user on the social network, the command comprising an URL associated with the content. Requests to retrieve the content may then be received from the social network, the requests comprising the URL associated with the content. When requests to retrieve the content are received, it is determined whether the content is authorized for viewing based on the at least one sharing parameter. If the content is authorized for viewing, the content is returned in response to the request.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 11-46 are screen diagrams illustrating various aspects of user interfaces presented by the content sharing application or other components of the content sharing system, according to embodiments of the present disclosure.

DETAILED DESCRIPTION

The present disclosure describes systems, methods, and software for sharing content within social networks. Users of social networks lack adequate abilities to control the content the user wishes to share. For instance, if the user desires to share an image with a particular user, the sending user has no control over the later actions of the receiving user. Additionally, the sending user may wish to have the content published only for a limited time period or for a limited number of views. The systems, methods, and software disclosed herein address these issues, among others.

Figure 1:
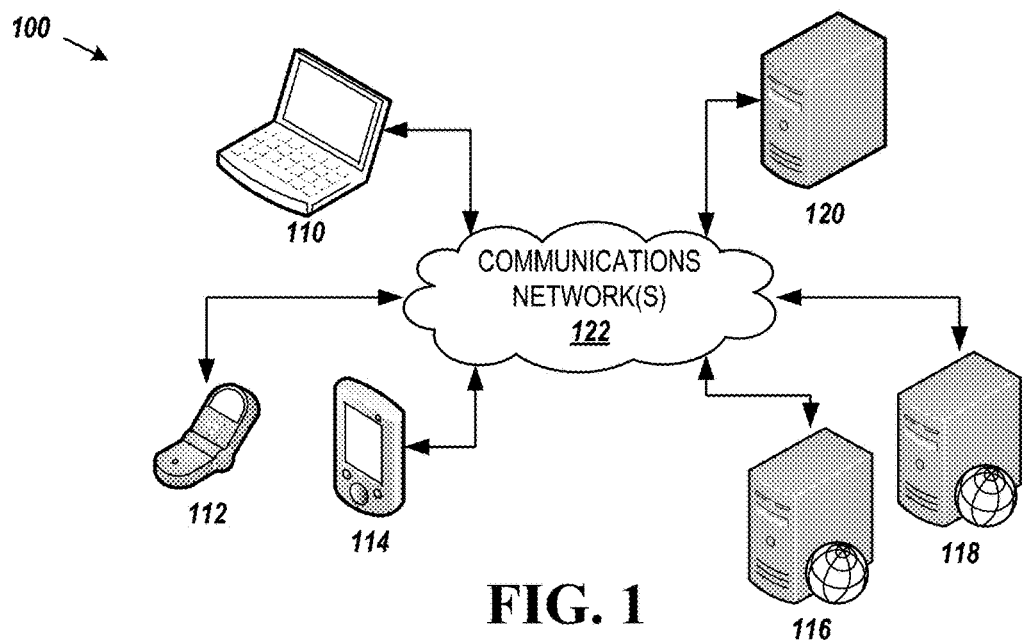
FIG. 1 is a block diagram of a content sharing system for sharing content within social networks according to some embodiments of the present disclosure.

FIG. 1 is a block diagram of an embodiment of a content sharing system 100 according to various implementations of the present disclosure. The content sharing system 100 may also be referred to herein as the "BackPeddle system" or "BackPeddle." The content sharing system 100 includes one or more user devices, such as user devices 110, 112, and 114, one or more computer systems hosting social networks; such as social networks 116 and 118, and a content sharing server 120. These and other systems are capable of interacting and communicating via one or more communication networks 122. The user devices 110, 112, 114 may include mobile devices such as smart phones, including iPhones, BlackBerries, and Android-based devices, application-enabled mobile phones, personal computers, etc. The social networks 116, 118 may include FACEBOOK® social networking service from Facebook, Inc. of Menlo Park, Calif., TWITTER® microblogging service from Twitter, Inc. of San Francisco, Calif., FLICKR™ imaging hosting service from Yahoo, Inc. of Sunnyvale, Calif., LINKEDIN® professional networking services from LinkedIn Corporation of Mountain View, Calif., GOOGLE+ social service from Google, Inc. of Menlo Park, Calif., etc. The communication network(s) 122 may represent telephone lines, such as land line or public switched telephone network (PSTN) systems, mobile phone channels and systems, communication channels for exchanging data and information, such as a local area network (LAN), wide area network (WAN), and/or other data, communication, or telecommunication networks that collectively make up the Internet. In some embodiments, any communication network(s) 122 that support the TCP/IP protocol may be utilized.

Figure 2:
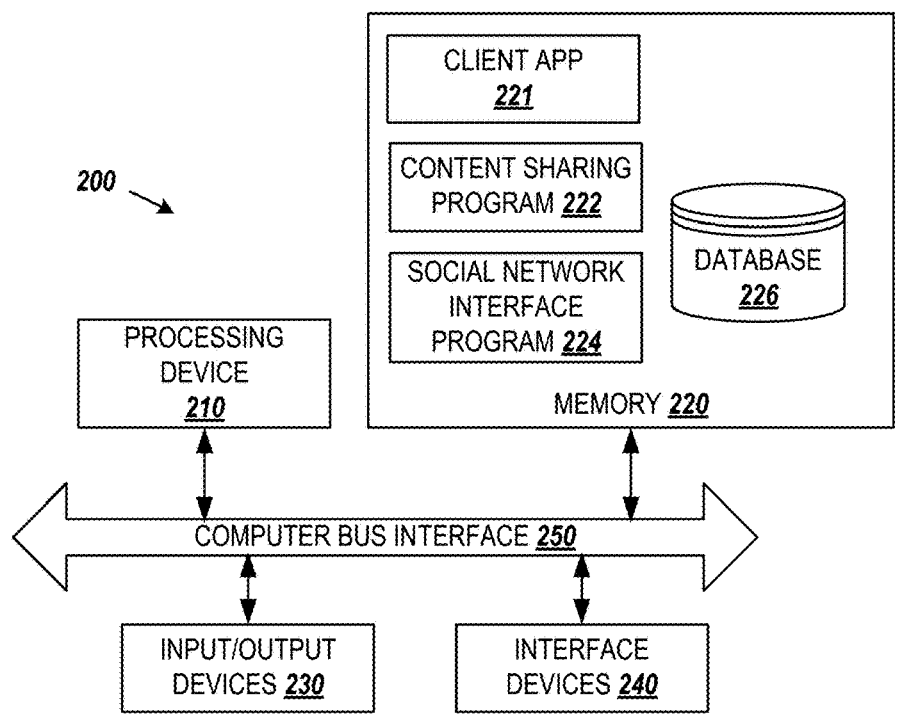
FIG. 2 is a block diagram illustrating a computer architecture for computing devices described herein as part of the content sharing system, according to various implementations of the present disclosure.

FIG. 2 is a block diagram illustrating an embodiment of a computer system 200 utilized in the content sharing system 100, according to various implementations of the present disclosure. The computer system 200 may represent a user device 110, 112, 114, the content sharing server 120 shown in FIG. 1, or another computer system comprising the systems described herein or for performing the methods described herein. As shown in this embodiment, the computer system 200 includes a processing device 210 and a memory device 220. The memory device may include a client app 221, a content sharing program 222, a social network interface program 224, a database 226, and/or the like. The computer system 200 further includes input/output devices 230 and interface devices 240. The components of the computer system 200 are interconnected and may communicate with each other via a computer bus interface 250 or other suitable communication devices.

In some embodiments, each component of the computer system 200 as shown may include multiple components on multiple computer systems of a network. For example, the computer system 200 may comprise servers, such as application servers, file servers, database servers, web servers, etc., for performing various functions described herein. The servers of the computer system 200 may for example be physically separate computer servers or virtual servers in a VMware ESXi 4.0 virtual environment, among other implementations.

The processing device 210 may be one or more general-purpose or specific-purpose processors, microcontrollers, or microprocessors for controlling the operations and functions of the content sharing server 120. In some implementations, the processing device 210 may include a plurality of processors, computers, servers, or other processing elements for performing different functions within the computer system 200.

The memory device 220 may include one or more internally fixed storage units, removable storage units, and/or remotely accessible storage units, each including a tangible storage medium. The various storage units may include any combination of volatile memory and non-volatile memory. For example, volatile memory may comprise random access memory (RAM), dynamic RAM (DRAM), etc. Non-volatile memory may comprise read only memory (ROM), electrically erasable programmable ROM (EEPROM), flash memory, etc. The storage units may be configured to store any combination of information, data, instructions, software code, etc. The client app 221, the content sharing program 222, the social network interface program 224, the database 226, and/or the like may be stored in one or more memory devices 220 and run on the same or different computer systems and/or servers.

In addition to the memory device 220, the computer system 200 may include other computer-readable media storing information, data, instructions, software code, etc. It will be appreciated by those skilled in the art that computer-readable media can be any available media that may be accessed by the computer system 200, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like. According to some embodiments, the computer system 200 may include computer-readable media storing computer-executable instructions that cause the computer system to perform aspects of the methods 400, 500, 600, 700, 800, 900, 1000, 4800, and 4900 described herein in regard to FIGS. 4, 5, 6, 7A-7C, 8, 9, 10, 48, and 49, respectively.

The input/output devices 230 may include various input mechanisms and output mechanisms. For example, input mechanisms may include various data entry devices, such as keyboards, keypads, buttons, switches, touch pads, touch screens, cursor control devices, computer mice, stylus-receptive components, voice-activated mechanisms, microphones, cameras, infrared sensors, or other data entry devices. Output mechanisms may include various data output devices, such as computer monitors, display screens, touch screens, audio output devices, speakers, alarms, notification devices, lights, light emitting diodes, liquid crystal displays, printers, or other data output devices. The input/output devices 230 may also include interaction devices configured to receive input and provide output, such as dongles, touch screen devices, and other input/output devices, to enable input and/or output communication.

The interface devices 240 may include various devices for interfacing the computer system 200 with one or more types of servers, computer systems and communication systems, such as a network interface adaptor as is known in the art. The interface devices 240 may include devices for communicating between the content sharing server 120 and the user devices 110, 112, or 114 and/or the social networks 116, 118 over the communication network(s) 122, for example. In some examples, the interface devices 240 may include a network interface adapter or other hardware or software interface elements known in the art.

The client app 221 may comprise a user application for facilitating the sharing of content within social networks, as described herein. In some embodiments, the client app 221 may execute directly on a user device 110, 112, 114 and interface with the content sharing server 120 over the communication network(s) 122. The client app 221 may further represent a web-based application executing on the content sharing server 120 or other web server and delivered to a web browser executing on the user devices 110, 112, 114 over the communication network(s) 122. The client app 221 may be implemented in hardware, software, or any combination of the two on the user devices 110, 112, 114, the content sharing server 120, and/or other computing systems in the content sharing system 100. The client app 221 may also be referred to herein as the "BackPeddle app" or the "BackPeddle application."

The content sharing program 222 may include any suitable instructions for processing user content to be shared. For example, the content sharing program 222 may receive content from users of the content sharing network including photographs, videos, text, audio, etc., as well as sharing parameters such as expiration times, etc. The content sharing program 222 may be omitted from the content sharing server 120 in some embodiments or placed in a separate processing system according to other embodiments. The content sharing program 222 may be implemented in hardware, software, or any combination of the two on the user devices 110, 112, 114, the content sharing server 120, and/or other computing systems in the content sharing system 100.

The social network interface program 224, which is described in more detail below, includes instructions and templates for causing links to content to be published to social networks 116, 118, such as Facebook, Twitter, Flikr, LinkedIn, Google+, etc. The social network interface program 224 may also be configured to deactivate or make unavailable the published content associated with the links on the social networks 116, 118 based upon one or more specified sharing parameters. For example, if a sharing parameter associated with a particular photograph is set to cause that particular photograph to expire in one week, the social network interface program 224 may be configured to render that content no longer available when a link associated with the content on a social network 116, 118 is clicked after one week. The social network interface program 224 may also be configured to allow users to authenticate existing user accounts on social networks 116, 118, to create accounts on content sharing server 120, to connect with other friends on content sharing server 120 and/or social networks 116, 118, and to manage user content on social networks 116, 118, including uploading new content. Other implementations may omit one or more of the functions disclosed herein. The social network interface program 224 may be implemented in hardware, software, or any combination of the two on the user devices 110, 112, 114, the content sharing server 120, and/or other computing systems in the content sharing system 100.

Figure 3:
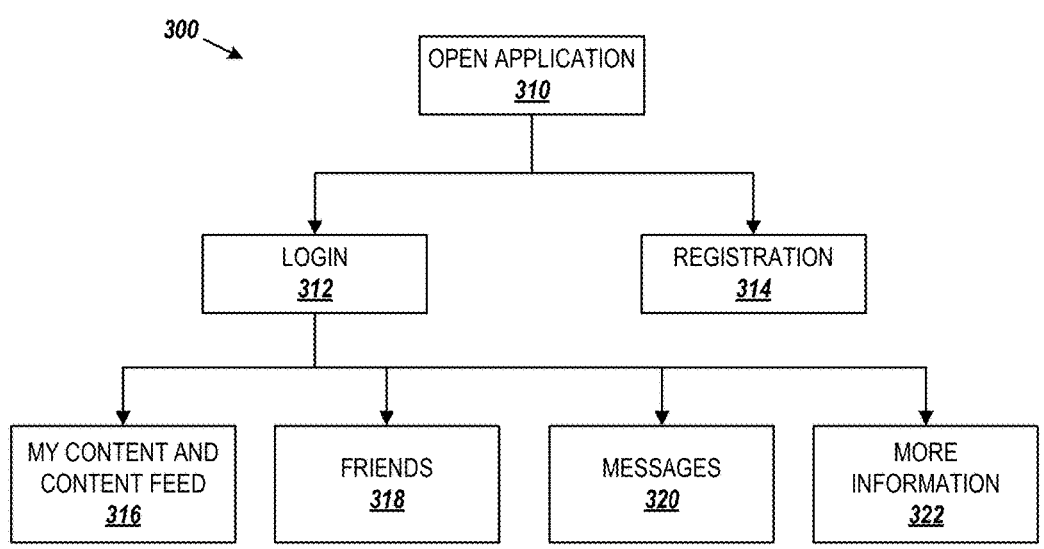
FIG. 3 is a block diagram illustrating a hierarchy of functions implemented by a content sharing application, according to some embodiments of the present disclosure.

FIG. 3 shows a hierarchy 300 of functions implemented by the client app 221 and/or the content sharing program 222 for sharing content on social networks according to embodiments of the present disclosure. At 310, a user opens an application, such as the client app 221, which may be running on the user's computer, mobile device, or through a web browser, as described herein. The user may login (312) if the user is already registered to use the application. Alternatively, the user may register (314) to use the application. Once the user is logged in to use the application, the user may access the user's content and content feed (316), the user's friends (318), the user's messages (320), and more information (322). These functions will be further understood as described below with reference to FIGS. 4-10.

Figure 4:
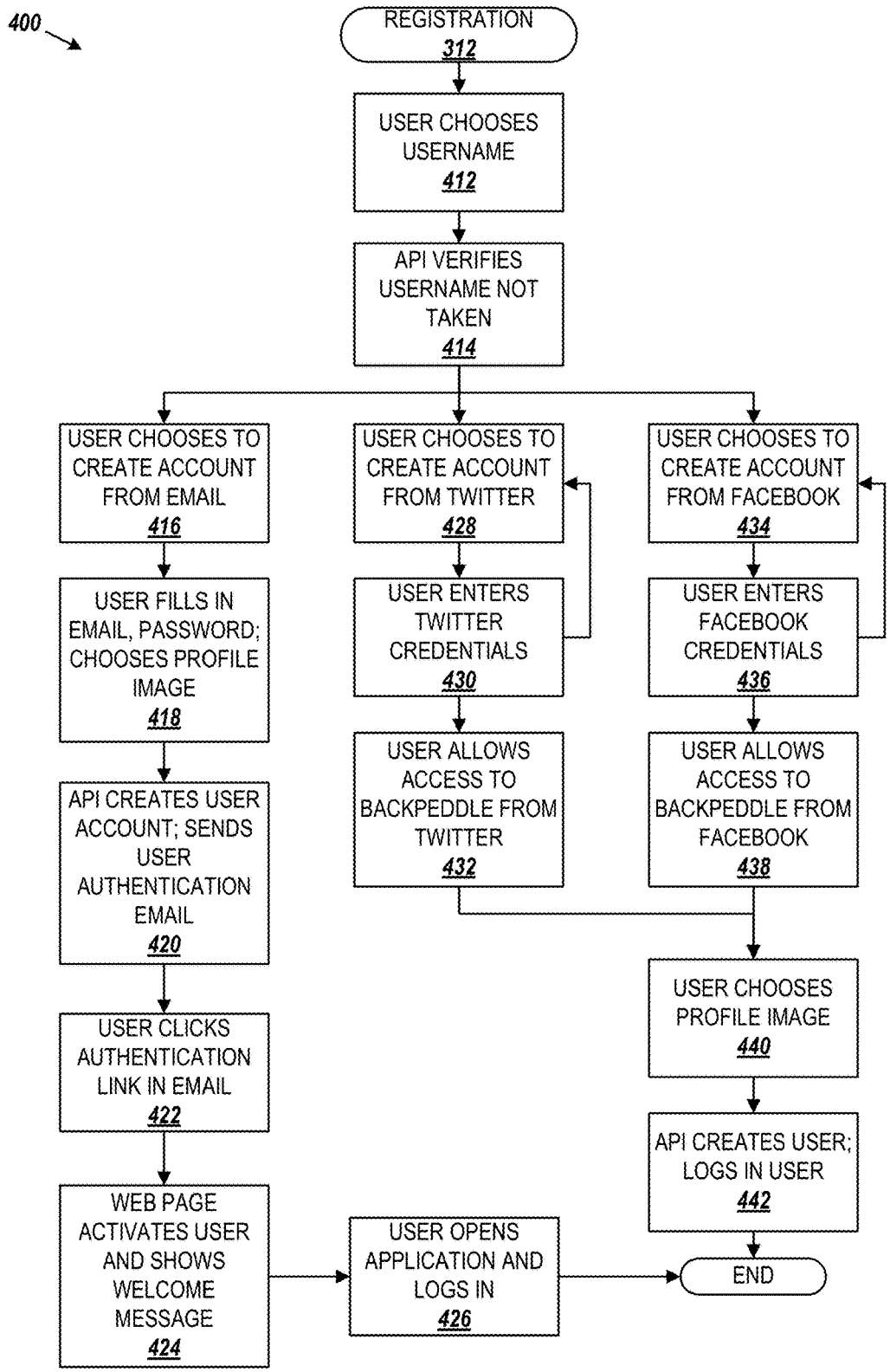
FIG. 4 is a flow diagram illustrating one method for registering with the content sharing system for sharing content on a social network, according to some embodiments of the present disclosure.

FIG. 4 shows one example of a method 400 for registering with the content sharing system 100 for sharing content on a social network, according to embodiments of the present disclosure. The method 400 may enable a user to create a username in the content sharing system. Registrations can be linked to a social network account using calls to the respective social network's open APIs. As will be understood, the present disclosure may facilitate content sharing with any social network, but for simplicity, reference to Facebook and Twitter will be used throughout the disclosure as merely two non-limiting examples. According to some embodiments, the method 400 may be implemented by the client app 221, the content sharing program 222, and/or the social network interface program 224 described above in regard to FIG. 2. In some embodiments, a backend API may be implemented by the content sharing program 222 executing on the content sharing server 120. For example, the content sharing program 222 may implement a Representational State Transfer ("REST") interface to support content sharing functionality calls from the client app 221 executing on the user devices 110, 112, 114 or other applications or computers in the content sharing system 100 communicating with the content sharing program 222 and/or content sharing server 120 using the Hypertext Transfer Protocol ("HTTP") over the communication network(s) 122.

At step 412, an unregistered user enters a desired username. The client app 221 may send the username to the content sharing program 222 through the backend API to see if the username already exists in the system's database, such as database 226. If the user name already exists, then the user will be redirected to step 412 to enter a different username. If the username does not exist, the username will be assigned to the user in the system database 226. The user then may choose to create a standalone account from email (416) or link the user's account authentication to Twitter (428) or Facebook (434), for example.

Figure 47:
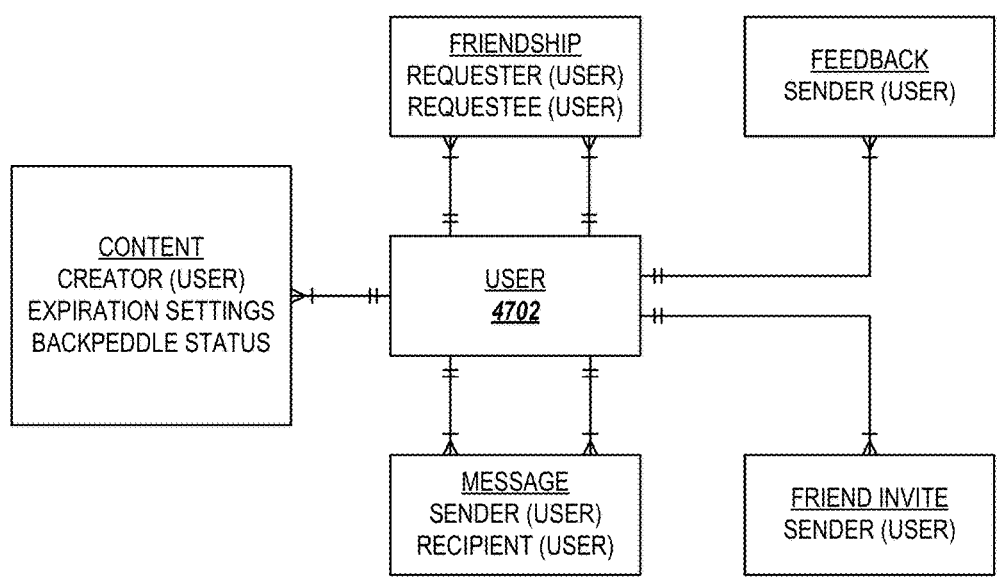
FIG. 47 is an entity relationship diagram ("ERD") illustrating one data model for a database used by or accessible to the content sharing system, according to some embodiments of the present disclosure.

If the user creates a stand-alone account from email (416), the user specifies its email address and password. Optionally, at step 418, the user may choose a profile image from their mobile device's camera roll. This information may be securely submitted from the client app 221 to the content sharing server 120 through a call to the backend API over an SSL connection via the communications network(s) 122. The data submitted over the backend API call is saved to the system database 226, where a user table record is created (422). For example, the database 226 on the content sharing server 120 may contain the entities (tables) and relationships as depicted in the ER diagram shown in FIG. 47, according to some embodiments. A user password and the user's email address may be associated with the username in the user table 4702. Passwords may be hashed using a bcrypt algorithm or other suitable algorithm for security purposes. If image data was submitted by the user, it may be written to shared storage accessible to some application servers. User records may be stored in the user table 4702 along with a unique ID number that will associate them with their social connections and content within the system.

Upon completion of creating the user account, an email message is sent to the user's email address (424). The email may contain a verification link to a web page that verifies the user's email address and account request. Optionally, the user account will not be active until the link in the email is clicked by the user. Clicking the link within the email activates the user's account. As shown at 426, the user may now log in to the client app 221 to access the functionality of the content sharing system 100. Once logged in, the user may choose to create an account linked to an existing social network account, such as a Twitter or Facebook login (428 and 434). Alternatively, the user may complete the registration process using an email address, a Twitter account, a Facebook account, and the like. Upon completion of the account creation and linking process, the registration process ends.

According to some embodiments, if the user opts to create an account linked to an existing Twitter account, the user enters their existing Twitter credentials and the application submits the information over a secure connection to Twitter's OAuth service for verification (430). The Twitter OAuth API call attempts to verify the Twitter credentials submitted. Upon successful verification, a proprietary API call may be made to the content sharing program 222 to create the user record in the system database, and the user's Twitter account ID stored in the system's user table. If the OAuth API cannot authenticate the user, the user may be notified and redirected to attempt the process again. Next, the user is prompted by the application to allow access from Twitter (432). This information may be written to a database on the local device's database or memory or to the system's database 226. Then, the user may be prompted to upload a profile picture and a user record is created (440). Social network ID information for the user may be stored in lieu of passwords in the user table 4702. Further authentication through social networks inside of the application may be verified by API calls to the respective providers.

The user may additionally or alternatively choose to create an account linked to an existing Facebook account (434). In this case, the user may enter their existing Facebook credentials, and the client app 221 may submit the information over a secure connection to existing Facebook service for verification (436). The Facebook authentication API call attempts to verify the Facebook credentials submitted. Upon successful verification, a backend API call may be made to the content sharing program 222 to create the user record in the database 226, and the Facebook account ID is stored in the system's user table 4702. If the backend API cannot authenticate the user, the user may be notified and redirected to attempt the process again. Once successfully, the user may allow access to the user's Facebook account (438), and may optionally upload a profile image (440).

Figure 5:
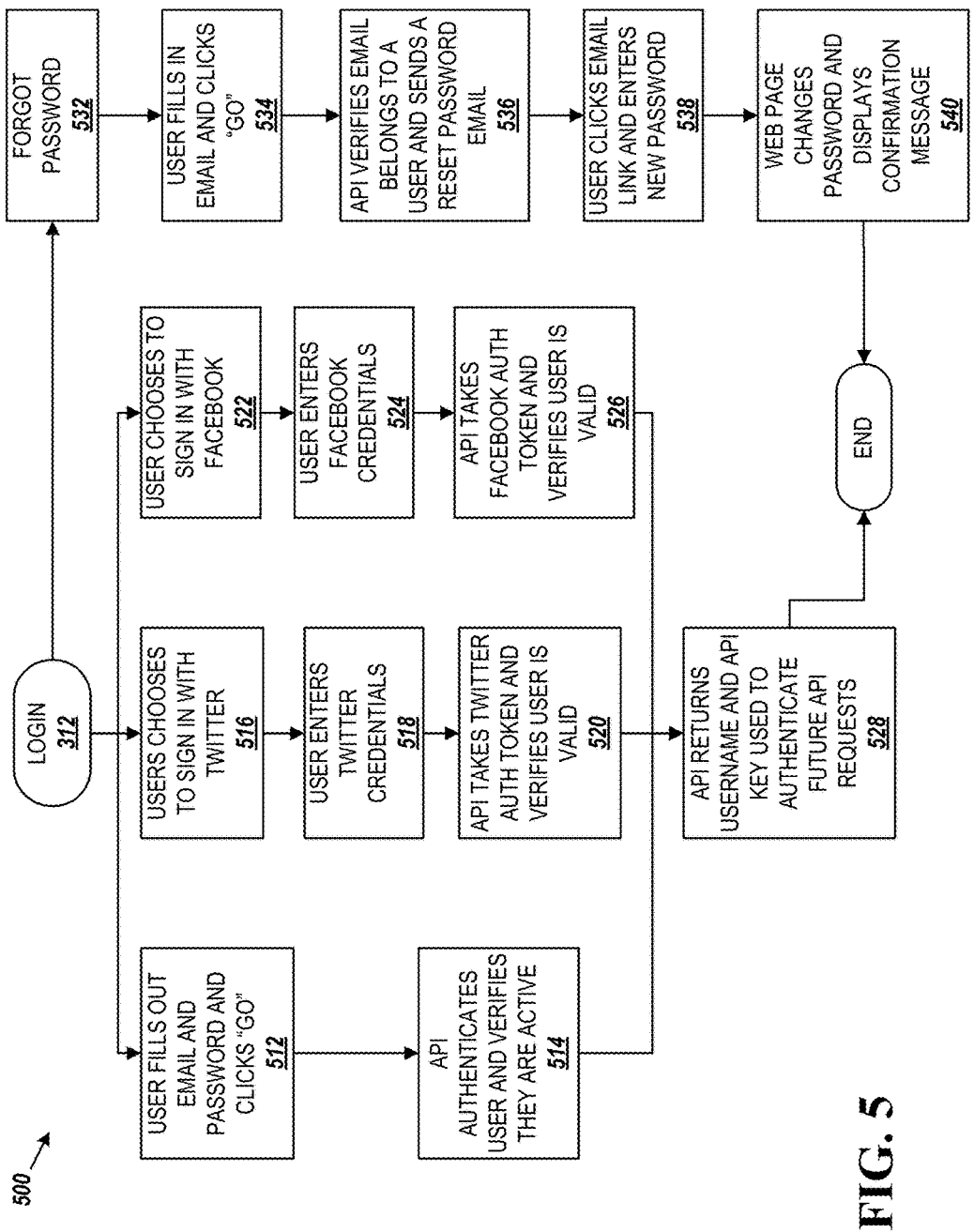
FIG. 5 is a flow diagram illustrating one method for logging in to the content sharing application for sharing content on a social network, according to some embodiments of the present disclosure.

FIG. 5 shows one example of a method 500 for logging in to the client app 221 for sharing content on a social network, according to embodiments of the present disclosure. According to some embodiments, the method 500 may be implemented by the client app 221, the content sharing program 222, and/or the social network interface program 224 described above in regard to FIG. 2. Once an account has been created, the user can log in to the client app 221 using a method similar to that of the registration method of FIG. 4. A main login screen may be presented to the user on the user device 110, 112, 114 having two fields for the user to enter their email and password and a sign-in button such as a "Go" button (512). The client app 221 may submit the credentials via the backend API, and the content sharing program 222 may verify that a user exists via the email address and the password matches for that user (514). Once a user has been verified, the content sharing program 222 may return the username and API key for that user to the client app 221 (528). Those two pieces of information may be used on future API requests to authenticate the user. In this way, regardless of the registration/login method, each user accesses the API in the same way.

On the main login screen, the user may choose to log in using Twitter (516) or Facebook (522). In either case, the user will enter their Twitter or Facebook credentials (518 and 524 respectively) into the Twitter or Facebook login screen via the associated open API. Once Twitter or Facebook verifies that the user is valid (520 and 526 respectively), the APIs will pass off authentication tokens for the content sharing system 100 to use. The content sharing program 222 may then take the authentication token(s) provided by the Twitter API or Facebook API and make its own call to the Twitter API or Facebook API to verify it Twitter or Facebook user ID is a valid user of the content sharing system 100 (528). The user's username and API key are then returned to the client app 221 (528). Upon completion of the login process, the process ends.

Optionally, from the main screen, the user may also have the ability to reset their password if necessary, as shown at 532. In one embodiment, this method is only available to user's who have previously registered their account using their email address, while Facebook and Twitter authenticated user's must reset their password from those respective applications. To initiate the "forgot password" process at step 534, the user enters the email address of the user. It is then verified that the email address belongs to a user account (536). The content sharing program 222 may then send an email to that address that contains a link to change the password of that account (538). Optionally, the link that is created is uniquely generated and expires after a given time period to prevent unauthorized access. At step 538, once the user clicks the link in their email, the user is presented with a web page that allows the user to enter a new password for that account, optionally requiring the user to confirm the password to ensure it is correct. After the new password is submitted, at step 540 the web page updates the user's password in the database 226, optionally ensuring it is hashed to prevent decrypting it and the password reset token may be deleted so that token cannot be used again. Optionally, a confirmation message is displayed to the user so the user knows the change occurred successfully. Upon completion of the password change process, the process ends.

Figure 6:
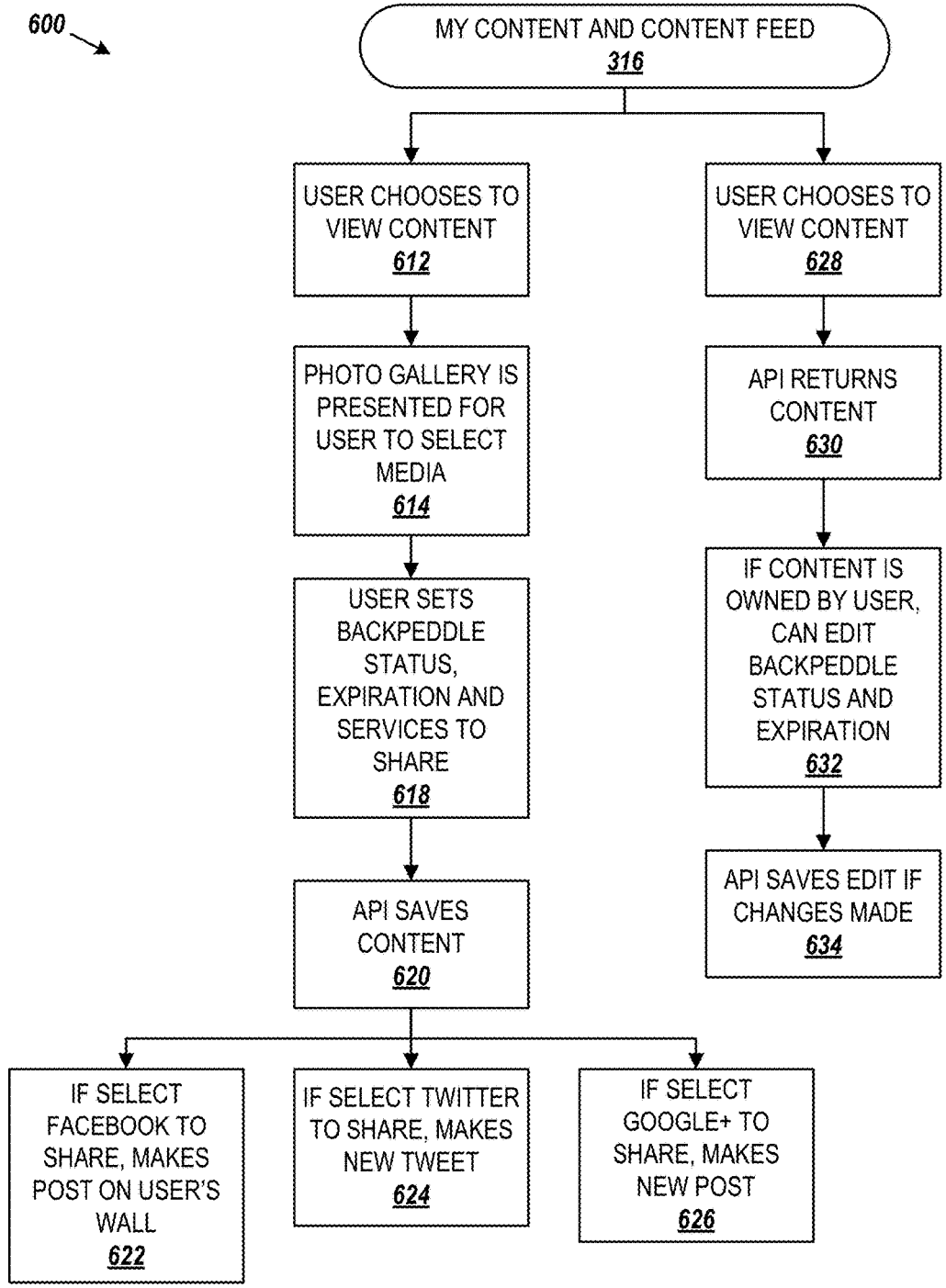
FIG. 6 is a flow diagram illustrating one method for selecting content to share on a social network, according to some embodiments of the present disclosure.

FIG. 6 shows one example of a method 600 for selecting content to share on a social network, according to embodiments of the present disclosure. The method 600 may allow a user to create and share photographs, images, videos, audio, text, and other content with other users of the content sharing system 100. According to some embodiments, the method 600 may be implemented by the client app 221, the content sharing program 222, and/or the social network interface program 224 described above in regard to FIG. 2. Upon making the appropriate selection within content selection areas of the client app 221, the user may be presented with a stream of content from the user and/or the user's friends also using the content sharing system 100.

At step 612, a user first chooses to view some content. Next, a content store on the user's device may be opened so that the user can choose the content the user wants to share with other users on one or more social networks (614). Alternatively, the user may create new content using a camera or other means on the user device 110, 112, 114. Once a piece of content is chosen or created, the user may then choose to set one or more sharing parameter values for the selected content, such as a status flag (also referred to herein as a "BackPeddle status"), a future publish date, an expiration time specifying that the user wants the content to be automatically removed or deleted after a certain amount of time or time-delay period, and the like (618). Optionally, in one embodiment, the content may be delayed for a short time, such as thirty seconds, before publication to allow the user to remove the content before being made public. Additionally, the user can pick the social network(s) to which the user desires for the content to be published. The social network(s) may have defaults for sharing parameters initially selected from the user's preferences (such as expiration time, etc.), or the user may set preferences when uploading the content.

At step 620, the content sharing program 222 stores the selected content on the content sharing server 120 along with the associated sharing parameters. The content and sharing parameters may be stored in the database 226, for example. The client app 221 and/or the content sharing program 222 then submits the content to selected social network(s) 116, 118 to make the content available for other users to view based on the sharing parameters, such as the BackPeddle status and expiration settings, as will be described in more detail below in regard to FIG. 48. For example, if the user has selected Facebook to share this content on, a new post will be created on the user's wall with a link to the shared content (622). If the user has selected Twitter to share this content on, a new tweet will be created referencing the new content (624) created on the content sharing server 120. If the user has selected Google+ to share this content on, a new post will be created with a reference to the content (626).

According to some embodiments, content on social networks is distributed by direct links to the images, posted on the users' timelines or feeds using API calls to the appropriate social network. Links on the social networks are not removed by the content sharing program 222 or other component of the content sharing system 100 when the content expires or the BackPeddle status is changed (referred to herein as being "backpeddled"), but the content that the link points to is rendered as unavailable by the social network interface program 224, as will be described in more detail below. According to some embodiments, this may be done by un-publishing the content on the date specified in sharing parameter values specified with the content selection/creation or by manual process from the publishing user. As no image shared is directly linkable, the middle tier security renders the content unavailable at the appropriate time or in the event that it is manually unpublished (i.e., backpeddled).

At step 628, if a user chooses to view content in the content sharing system 100, the user may select the desired piece of content in order to view it. The client app 221 may request the content for viewing from the content sharing program 222 through the backend API. Once the request has been made, the content sharing program retrieves the requested content from the database 226 on the content sharing server 120 and returns it to the client app 221, verifying that the user has access to it and that it has not been removed based on the owners expiration time settings or BackPeddle status (630). If the selected piece of content belongs to the viewing user, the client app 221 may further provide the user with options to edit that content and set the BackPeddle status as well as set a future expiration time (632) or change other sharing parameters. If changes have been made, the content sharing program 222 may save the edits in the database (634).

Figure 7A:
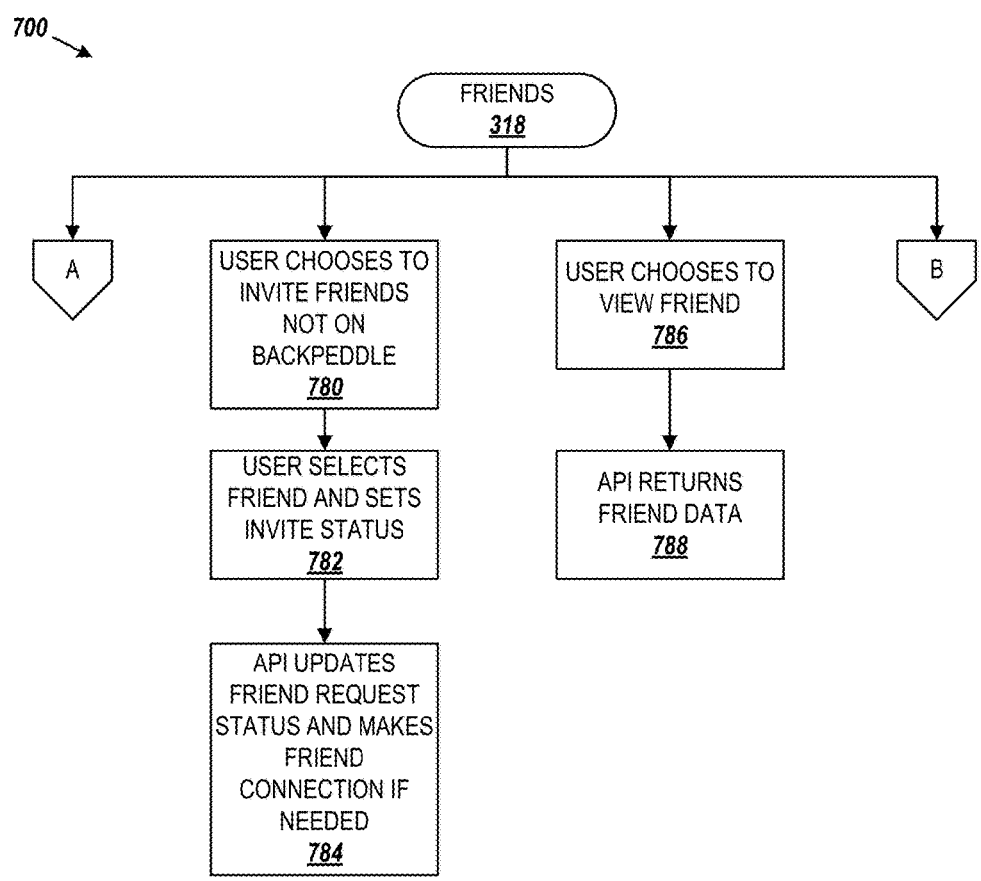
FIGS. 7A-C are flow diagrams illustrating one method for selecting and connecting to "friends" (i.e., other members) of the content sharing system with which to share content, according to some embodiments of the present disclosure.
Figure 7B:
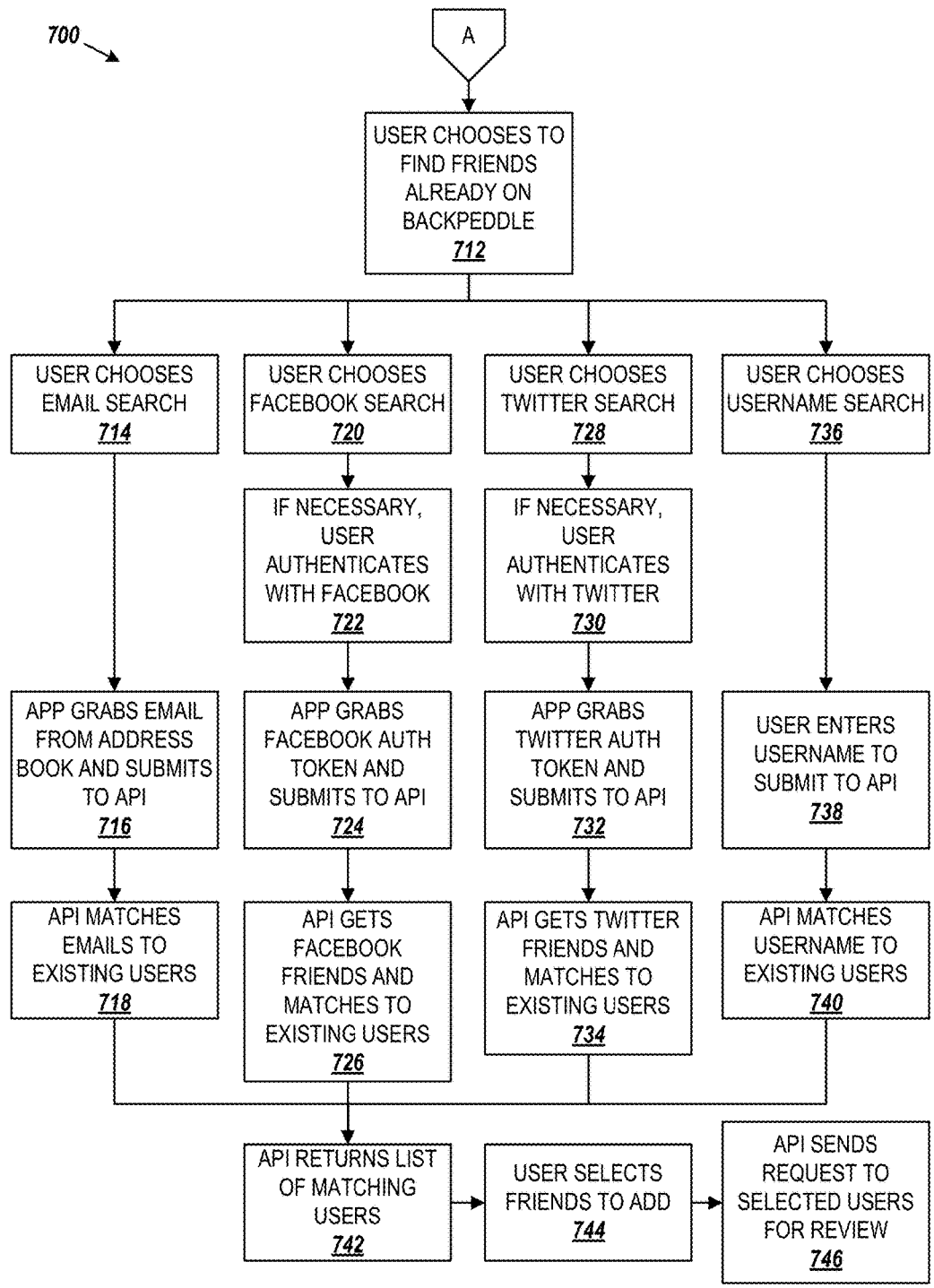
Figure 7C:
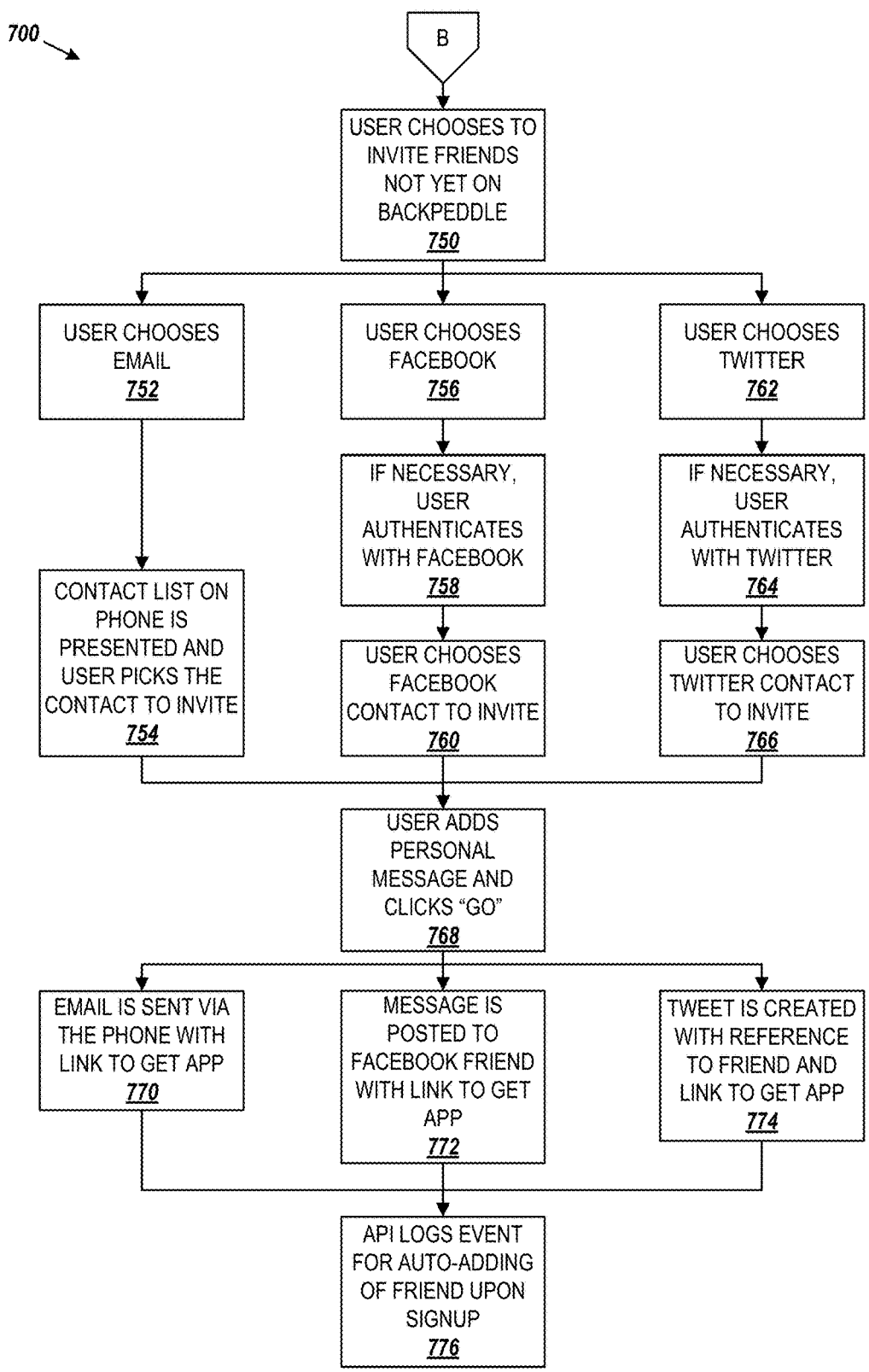

FIGS. 7A-7C show one example of a method 700 for selecting and connecting to "friends" (i.e., other members) of the content sharing system 100 with which to share content, according to embodiments of the present disclosure. The method 700 may allow users of the content sharing system 100 to find and add friends that are already registered with the content sharing system 100 as well as invite friends from other third-party social networks 116, 118, contact records, or the like to register with the content sharing system. Friends may be displayed by username alphabetically or in other arrangements. According to some embodiments, the method 700 may be implemented by the client app 221, the content sharing program 222, and/or the social network interface program 224 described above in regard to FIG. 2.

As shown at 712 in FIG. 7B, a user may choose to search for friends that already have already registered with the content sharing system 100. The user may select to search in different ways, such as by using email, using Facebook search, using Twitter search, using username, and the like. If the user chooses to search by email (714), the client app 221 may open the user's address book on the user device 110, 112, 114 and obtain the email addresses contained therein and submit the email addresses through the backend API to the content sharing program 222 (716). The content sharing program 222 may use the email addresses to match them to users in the database 226 that have provided their email address during registration (718). The results of those matches are returned to the user. Optionally, additional information may be presented to the user depending on the search that was initiated, for example a Twitter search may return the user's Twitter handle (742). Once the user sees the results, the user may choose which users they want to "friend" or establish connections with. After the user has selected one or more people to friend, the client app 221 may request through the backend API that the content sharing program 222 generate friend requests for each of those users to review and accept or decline. The friend requests may be stored in the system database 226 on the content sharing server 120.

Alternatively, the user may choose to search by Facebook (720) or Twitter (728). Unless the Facebook or Twitter credentials are already saved by the application, the user will be required to log in to their Facebook account or Twitter account and provide access to the BackPeddle Facebook/Twitter application using each social network's respective API (722, 730). The client app 221 will then take the user's authentication token and submit it to the content sharing program 222 for further processing (724, 732). The content sharing program 222 will take the credentials and generate a list of Facebook/Twitter user IDs of the friends of the user (726, 734). It may also search the database 226 to find any friends that are also users of the content sharing system 100. In some embodiments, the user may also search by username (736). The user may provide a full or partial username to the client app 221 and initiate the search (738). The client app 221 may then submit the search text to the content sharing program 222, which matches that search text against all usernames in the database 226 and returns a list of users (740).

As shown in FIG. 7C, if the user does not find the friend they were looking for by a search, they can choose to invite someone that may not be an existing user of the content sharing system 100 (750). In one embodiment, the user may be presented with different options to invite users, such as by email (752), by Facebook (756), and by Twitter (762). If the user chooses to invite by email, the client app 221 may open the user's contact book on the user device 110, 112, 114 and allow the user to select a recipient of the invitation (754). Once the user is selected, the user may be presented with an input box to optionally add a personal message to the invitation, and the client app 221 then initiates sending the invite (768). An email is created and sent using the user device 110, 112, 114 with a link to download the BackPeddle application (770). Once the invite is sent, the client app 221 may call the content sharing program through the backend API to log the transaction and save it to the system database 226 so that when that friend registers for an account in the content sharing system 100, a friend relationship is automatically added with the requesting user (776).

If the user choose to invite someone by Facebook (756) or Twitter (762), unless the Facebook/Twitter credentials have already been saved by the client app 221, the user may be required to log in to their Facebook account or Twitter account and provide access to the BackPeddle Facebook application (758) or Twitter application (764) over the respective APIs. The user may be able to select a Facebook or Twitter user to invite using a call over the Facebook or Twitter API directly from the user device 110, 112, 114 without making a call to the content sharing program 222 through the backend API (760, 766). The client app 221 may further provide the user with the ability to enter a personal message (768). Optionally, users may also add the "friend" one of a personal list of friend groups. The invitation is then created as a post to the requested user's Facebook wall or Twitter feed with a link to download the BackPeddle application (772, 774).). Once the invite is sent, the client app 221 may call the content sharing program 222 through the backend API to log the transaction and save it to the system database 226 so that when that friend registers for an account in the content sharing system 100, a friend relationship is automatically added with the requesting user (776).

Turning now to FIG. 7A, if there are open friend requests for the user to respond to, the client app 221 may present the user with a notification and directions to navigate to a screen to respond to these requests (780). The user may select the corresponding BackPeddle user to respond to and set the invite status from a list of available options, such as "Accept", "Reject", and "Ignore" (782). At step 784, once set, the client app 221 may send the selected status to the content sharing program 222, which logs the status for that friend request in the database 226. If the status is set to "Accept", then a new "friendship" relationship is created between the two users. If the status is set to "Ignore", the user will no longer show up under notifications, but the request may be saved to allow the user to reply to at a later date. In some embodiments, if the status is set to "Reject," the content sharing program 222 may delete the friendship request from the database 226. When one or more friendships have been made, the user may be provided with the option to select that user from the list of users for viewing (786). Once a user has been selected for viewing, the client app 221 may retrieve information for the selected user from the content sharing program 222 via the backend API and provide a list of shared content that the user has available to view (788).

Figure 8:
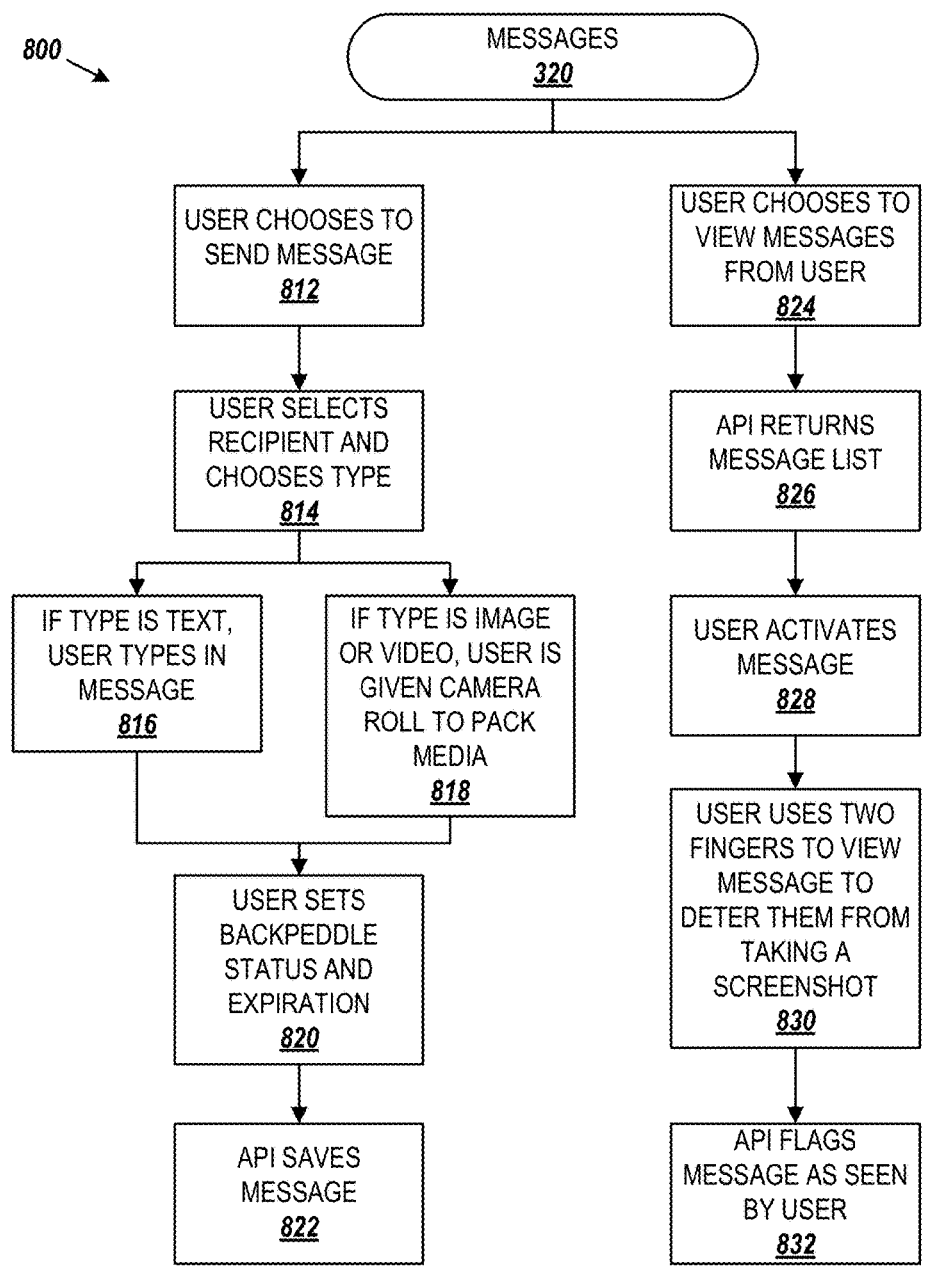
FIG. 8 is a flow diagram illustrating one method for sending and receiving messages through the content sharing system, according to some embodiments of the present disclosure.

FIG. 8 shows one example of a method 800 for sending and receiving messages through the content sharing system 100, according to embodiments of the present disclosure. The method 800 may enables users to send content between BackPeddle users which can be text, images, or videos and may also show users in which at least one message has been created ordered by the user that has sent the latest message. According to some embodiments, the method 800 may be implemented by the client app 221 and/or the content sharing program 222 described above in regard to FIG. 2.

At step 812, the user chooses to send a message to another BackPeddle user. At step 814, the user selects the recipient of the message, and if the user is already on the message list screen then the user may be automatically selected for them. If the user chooses to set the content as a text message, the user may input text into an input box (816). If the user chooses to set the content as an image or video, the user may select content stored on the user's device or the user may be prompted to create new content using a camera or other feature associated with the user device (818). After the user selects or creates the content to be shared, the user sets the BackPeddle status as well as optionally setting an expiration time for the content (820). For images or text messages, the user may optionally set the number of seconds that the receiving user is allowed to view the message. Optionally, images, text message, or videos may only be allowed to be seen a limited number of times. Once the user chooses the content to be shared, the content sharing program 222 takes the content and associated sharing parameters saves it to the database 226 of the content sharing system 100 (822).

Additionally, the user may choose to view messages from other users (824). On the main messages screen, the user may choose another user for which to view messages exchanged with the other viewer. Once the other user is selected, the content sharing program 222 will pull all messages between the users that have not been removed or expired and returns them to the device (826). At step 828, the user can select a message to view. Optionally, in order to deter screenshots by the viewing user, the user may be required to hold two fingers on the screen to prevent the user from taking a screenshot of the content using the user device's built-in screenshot mechanism 830. Optionally, the sending user may be notified using backend API calls when a recipient viewing the message has successfully captured (or has attempted to capture) a screenshot of the content. After the message has been viewed, the client app 221 makes a call to the backend API to cause the content sharing program 222 to mark that message as viewed so it no longer appears in the user's notifications (832).

Figure 9:
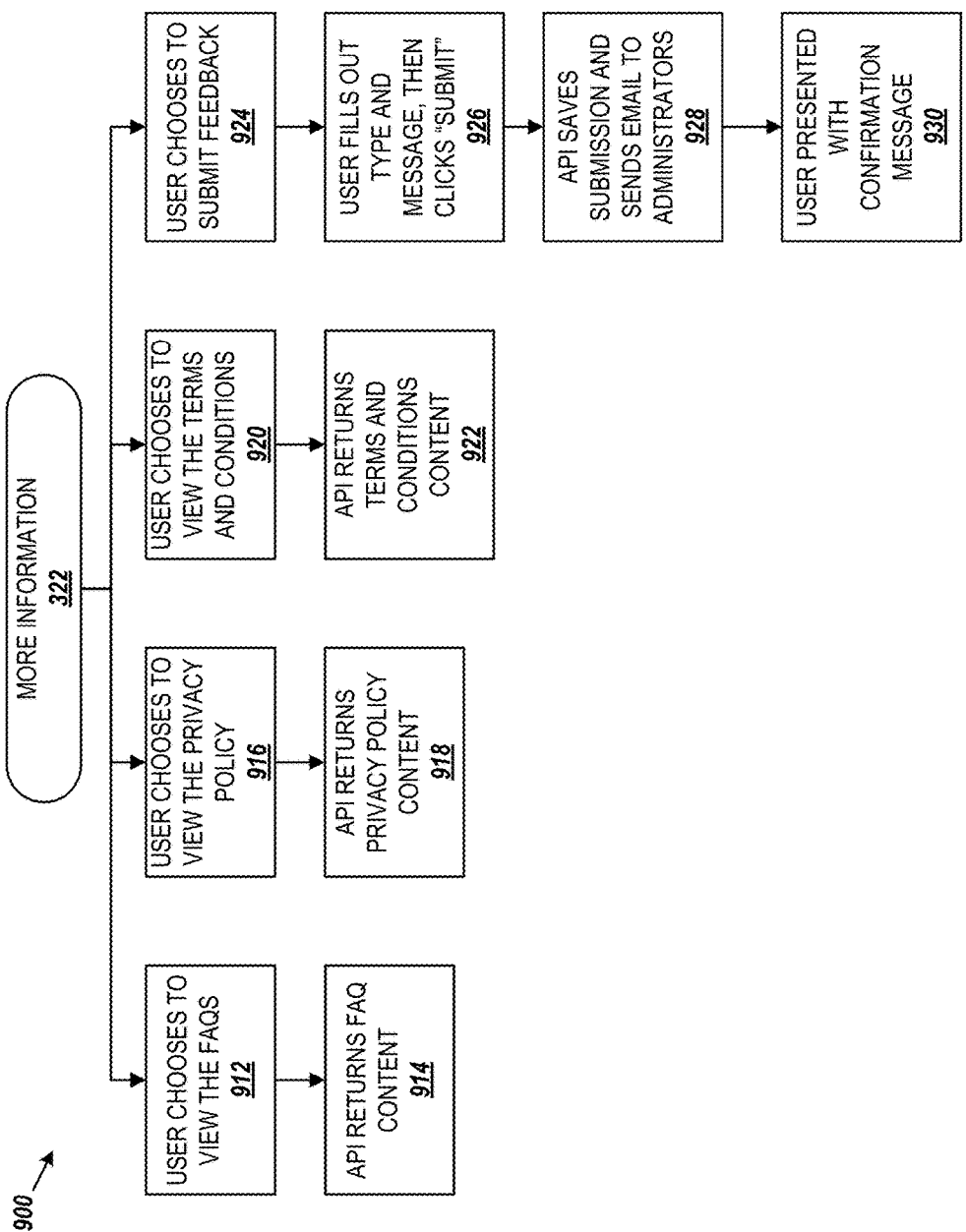
FIG. 9 is a flow diagram illustrating one method for viewing additional content relating to the content sharing system, according to some embodiments of the present disclosure.

FIG. 9 shows one example of a method 900 for viewing additional content relating to the content sharing system 100, according to embodiments of the present disclosure. The method 900 may enable users to view additional content related to the BackPeddle application and/or other aspects of the content sharing system 100, for example. According to some embodiments, the method 900 may be implemented by the client app 221 and/or the content sharing program 222 described above in regard to FIG. 2.

The user may request to view frequently asked questions (912), the privacy policy (916), and/or the terms and conditions (920) associated with the content sharing system 100. In response to viewing any of these sections, the content sharing program 222 may return the requested additional content to the client app 221 via the backend API, which then displays the additional content to the user (914, 918, and 922 respectively). Optionally, the user may choose to submit feedback relating to the example application (924). The user may be presented with a screen that allows the user to select the type of feedback, such as "General," "Technical," "Feedback," or the like, as well as an input box that allows the user to fill out a feedback message (926). The user may then click a submit button to send the feedback. The client app 221 may submit the feedback to content sharing program 222 through the backend API where it is saved to the database 226 of the content sharing system 100. Optionally, an email may be created by the content sharing program 222 to send the feedback to a list of system administrators depending upon the feedback type (928). Upon completion of the feedback submission, the user may be presented with a confirmation message to confirm the feedback has been submitted successfully (930).

Figure 10:
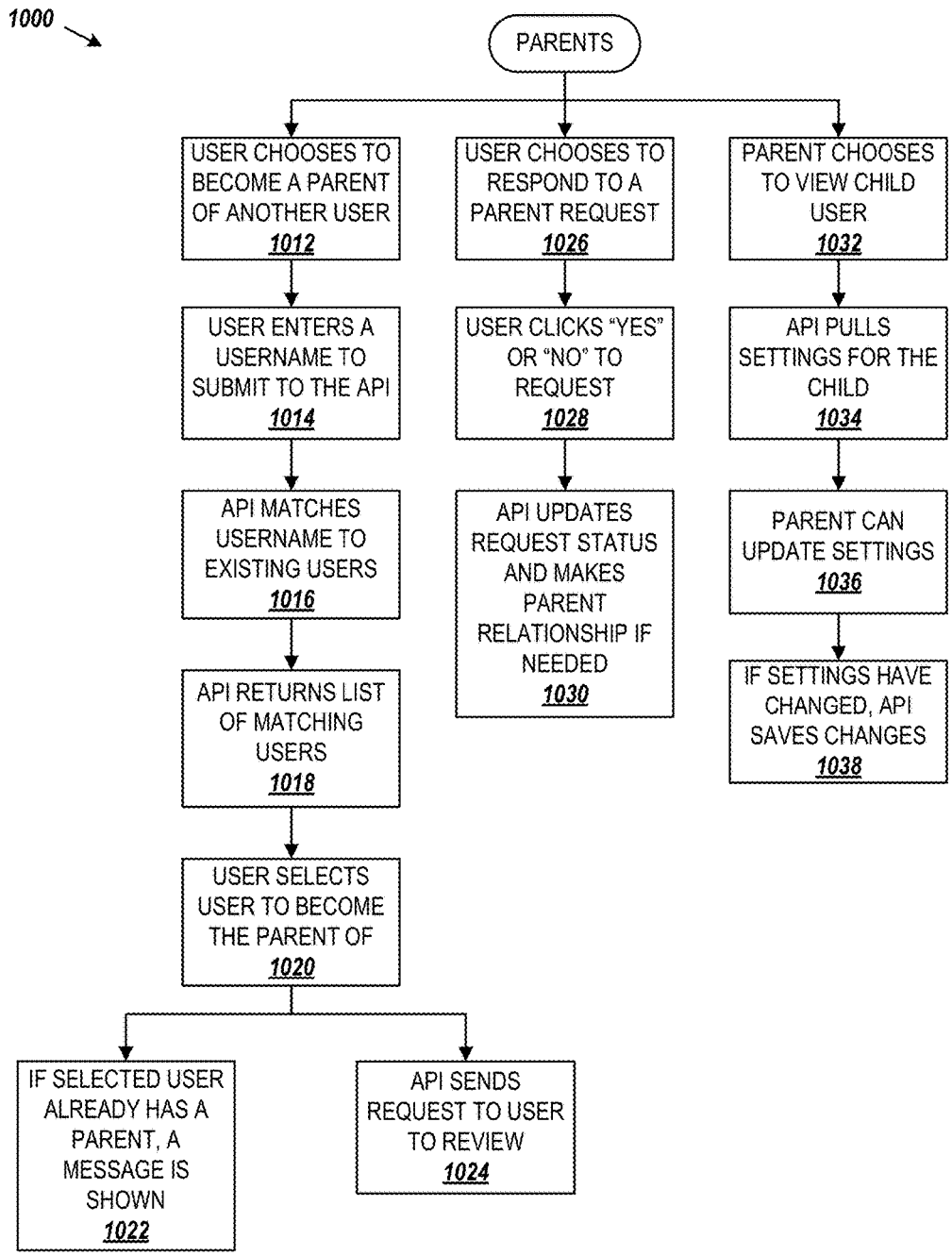
FIG. 10 is a flow diagram illustrating one method for establishing a parental relationship to another user of the content sharing system 100, according to some embodiments of the present disclosure.

FIG. 10 shows one example of a method 1000 for establishing a parental relationship to another user of the content sharing system 100, according to embodiments of the present disclosure. The method 1000 may enable a user of the content sharing system 100 to establish a parental relationship to another user. According to some embodiments, the method 1000 may be implemented by the client app 221 and/or the content sharing program 222 described above in regard to FIG. 2.

At step 1012, a parent user chooses to be a parent of child user's account. At step 1014, the parent user enters the desired child user's username into the search box. At step 1014, the content sharing program 222 may attempt to match the parent user's search against all users in the database 226. At steps 1016 and 1018, username matches will be returned from via the backed API to the client app 221 and displayed for the parent user to select. At step 1020, the parent user selects the desired child user to become a parent of. Optionally at steps 1022, once the user is chosen, if the user already has a parent relationship from the data that was returned in step 1018, then a notification message may be displayed informing the parent user that they cannot be a parent of that particular child user. When complete, the content sharing program 222 may create a request to be responded to by the child user.

At step 1026, a child user, having received a request from a potential parent user, chooses to respond to a parent request. The options for a parent response may be acceptance (yes) or denial (no) (1028). Optionally, once a request has been accepted, no other parent requests will be available to respond to, or alternatively, a user may be a child of multiple parents. At step 1030, the content sharing program 222 updates the request with the response, and if the response was accepted, then a parent relationship is created on the parent user's profile and/or the child user's profile in the database 226. At step 1032, if a parent user chooses to view a child user after the parental relationship is established, the content sharing program 222 returns the settings for that child user to the client app 221, which display the settings to the parent user on the user device 110, 112, 114 (1034). The parent user is then able to change the settings for that child user (1036), and the content sharing program 222 may save changes, if any were made (1038).

FIGS. 11-46 are screen shots of various aspects of user interfaces presented by the client app 221 or other components of the content sharing system 100, according to embodiments of the present disclosure. The user interfaces may enable the methods described herein in regard to FIGS. 3-10 to be executed on a user device 110, 112, 114. The screen shots depicted in the figures should be considered limiting, and each may have more, less, or different elements and information than that shown. Instead, the screen shots are merely one representation of a user interface for enabling the methods and software application disclosed herein.

FIGS. 11-14 illustrate example screen shots relating to the method 400 described above in regard to FIG. 4 for registering with the content sharing system 100. A user may perform actions including, but not limited to: logging in (1110), signing up (1112), entering a nickname (1210), receiving an error message (1212), creating an account (1214), creating account using Twitter (1216), creating account using Facebook (1218), entering email (1310), password (1312, 1314), viewing images (1316), finalizing registration (1318), selecting an avatar (1410), selecting a color (1412), and navigating the process (1220, 1320). Other embodiments may include additional options or may omit certain options shown herein.

Figure 16:
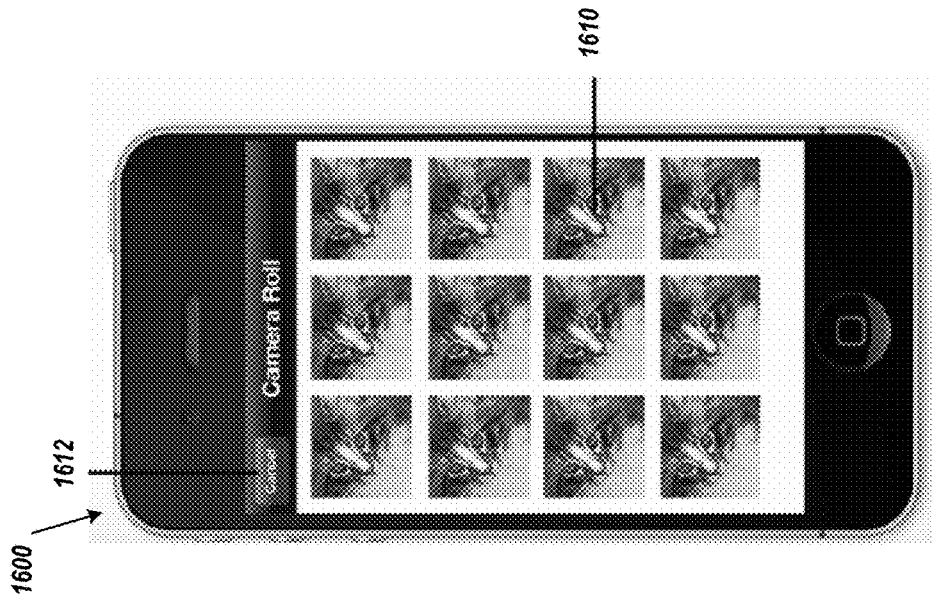
Figure 15:
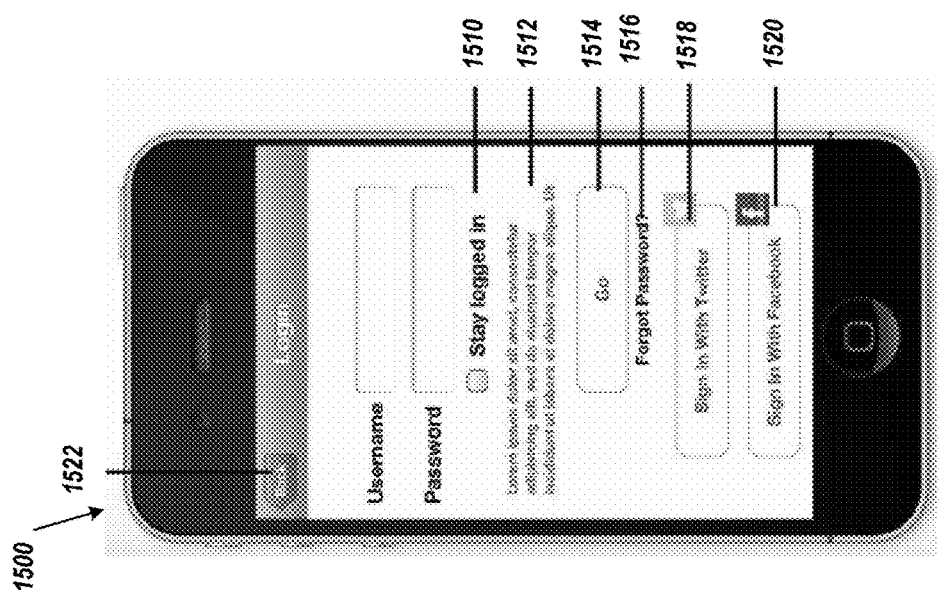
Figure 18:
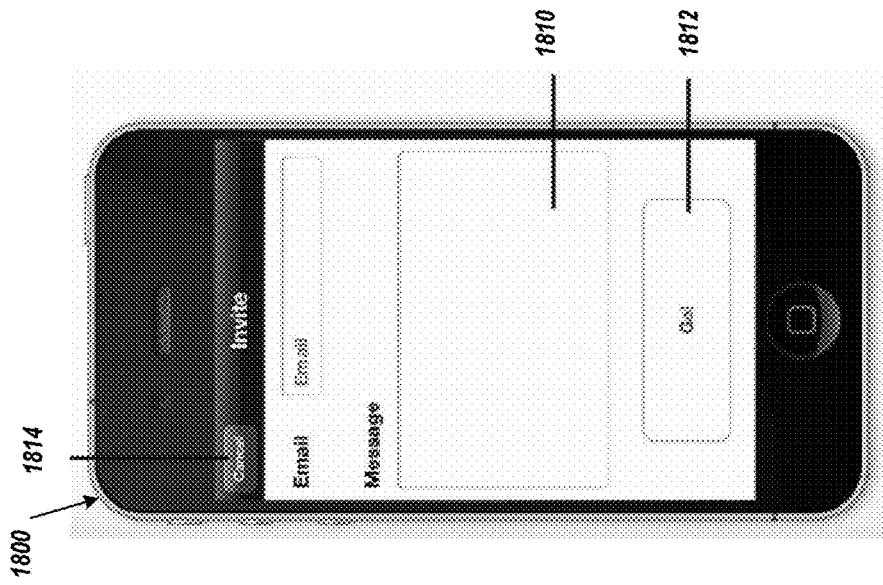
Figure 17:
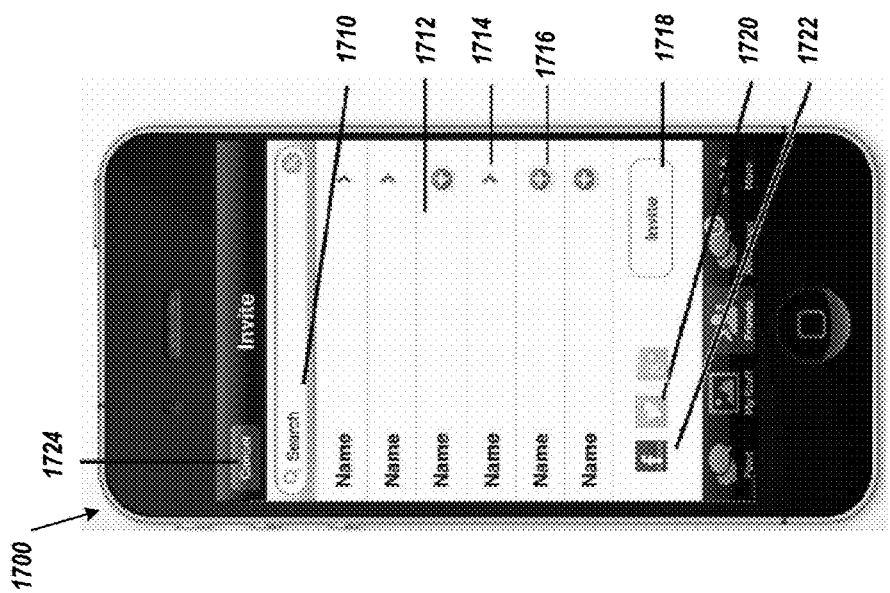

FIGS. 15-16 illustrate example screen shots relating to the method 500 described above in regard to FIG. 5 for logging in to the client app 221. A user may perform actions including, but not limited to: entering a username and password and choosing to stay logged in (1510), receiving an error message (1512), initiating login (1514), initiating a forgotten password process (1516), signing in with Twitter (1518), signing in with Facebook (1520), selecting an image (1610), and navigating the process (1522, 1612). Other embodiments may include additional options or may omit certain options shown herein.

FIGS. 17-21 illustrate example screen shots relating to the method 700 described above in regard to FIGS. 7A-7C for a user to select and connect to "friends" (i.e., other members) of the content sharing system 100. A user may perform actions including, but not limited to: searching usernames (1710), viewing users' profile screens (1712), initiating invites (1714, 1718, 1910), initiating friend request (1716, 1912), invite Twitter contacts (1720, 2010), invite Facebook contacts (1722), entering a personal message (1810), sending the invite (1812), selecting a friend through Twitter or Facebook (2010, 2110), and navigating the process (1724, 1814, 1914, 2012, 2112). Other embodiments may include additional options or may omit certain options shown herein.

Figure 22:
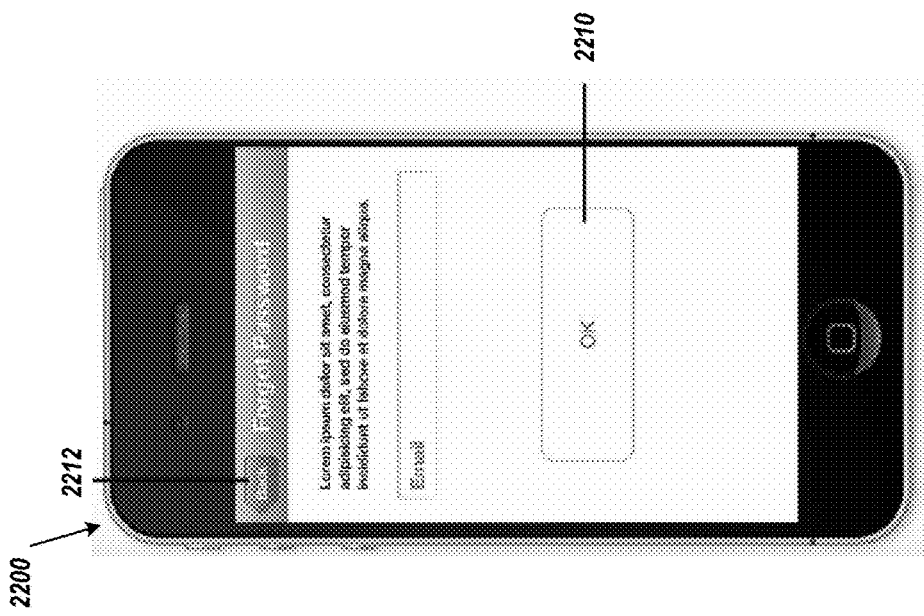
Figure 21:
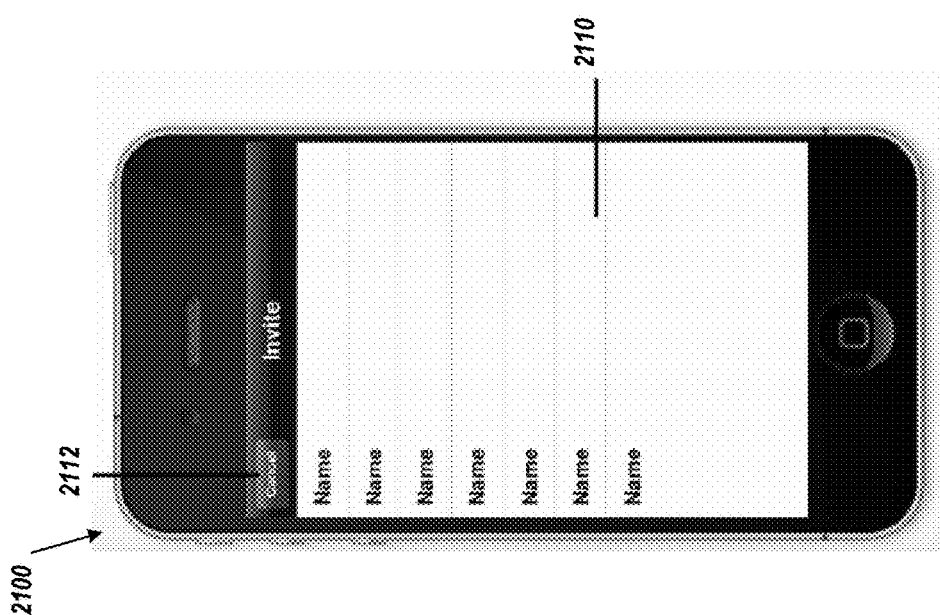

FIG. 22 illustrates an example screen shot relating to the method 500 described above in regard to FIG. 5 for recovering a forgotten password. A user may perform actions including, but not limited to: entering an email address and processing request to retrieve password (2210), and navigating the process (2212). Other embodiments may include additional options or may omit certain options shown herein.

Figures 23, 24:
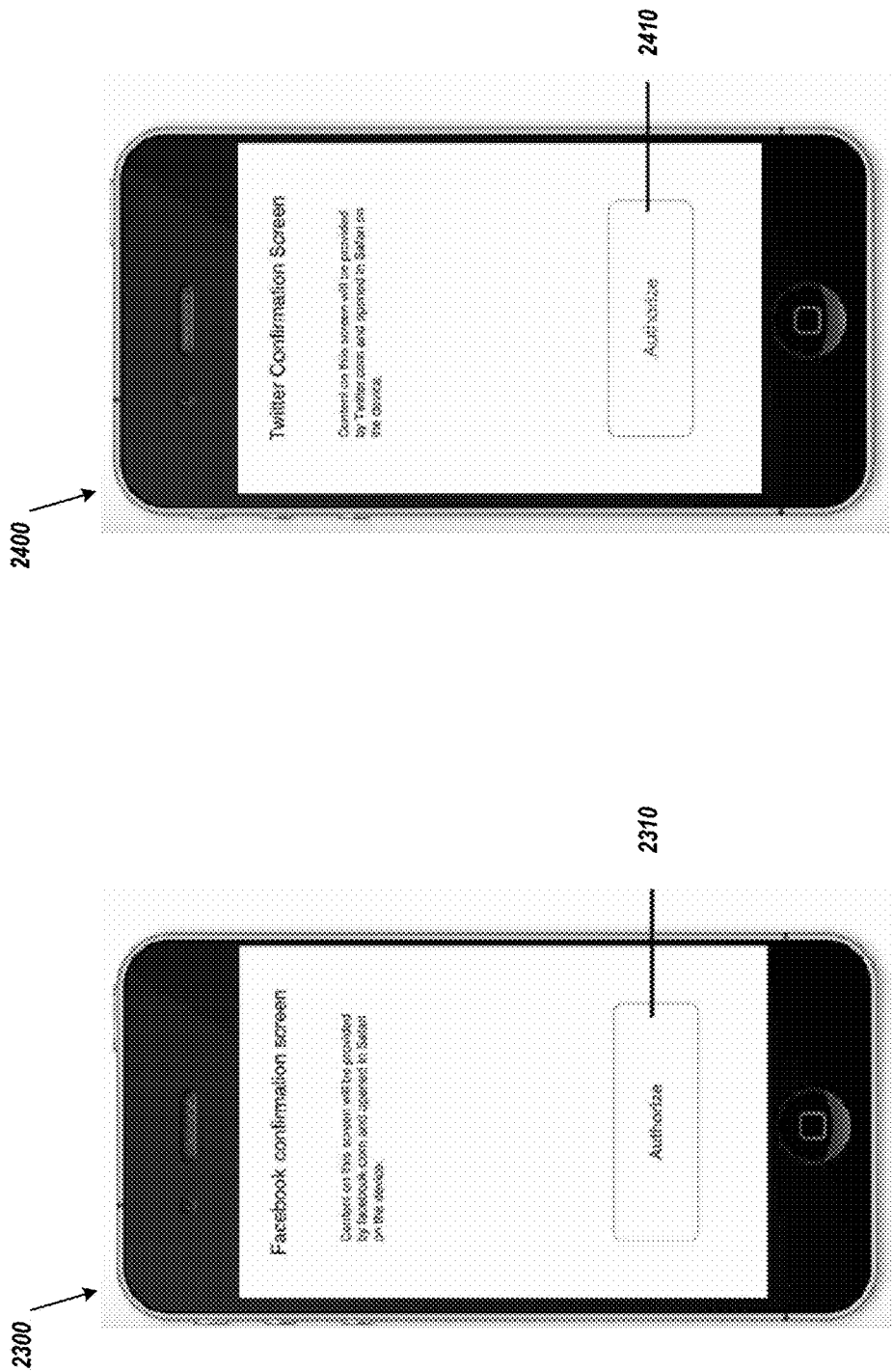

FIGS. 23-24 illustrate example screen shots relating to Facebook confirmation (2310) and Twitter confirmation (2410). Other embodiments may include additional options or may omit certain options shown herein.

Figure 25:
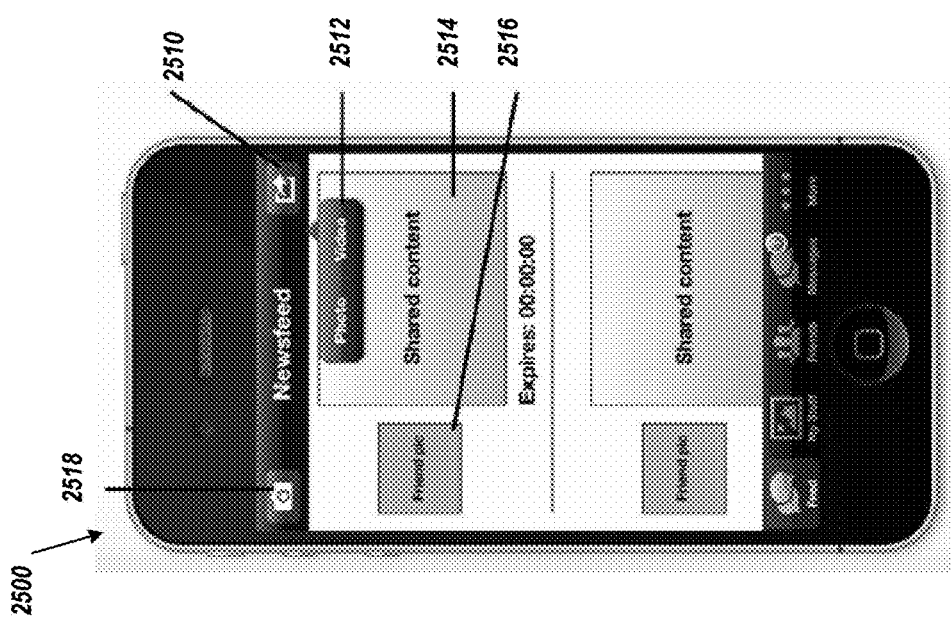

FIG. 25 illustrates an example screen shot relating to a user's newsfeed. A user may perform actions including, but not limited to: prompting a photo/video popup (2510), sharing photo or video (2512), viewing content in full screen (2514), viewing profile screen (2516), and taking a picture (2518). Other embodiments may include additional options or may omit certain options shown herein.

Figure 26:
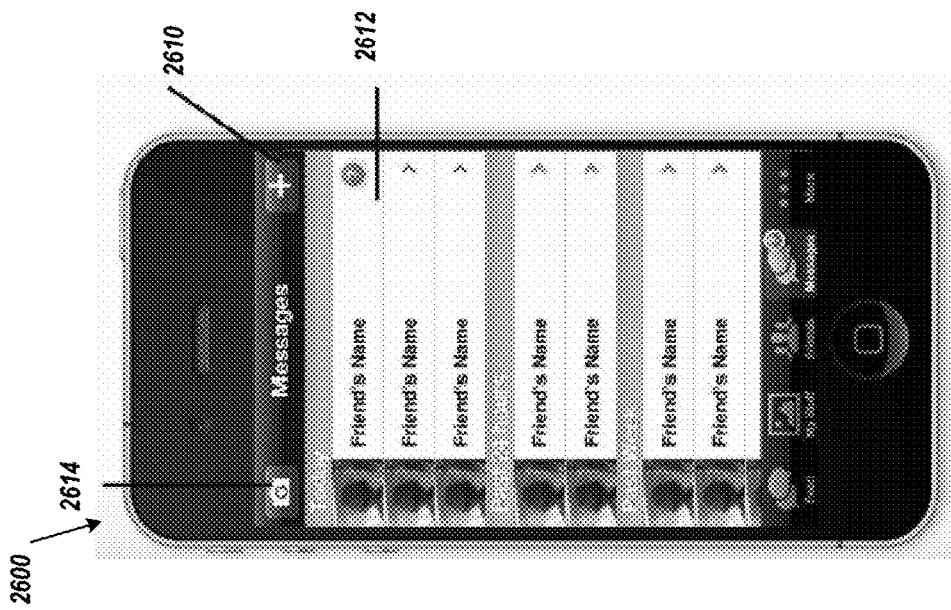
Figure 28:
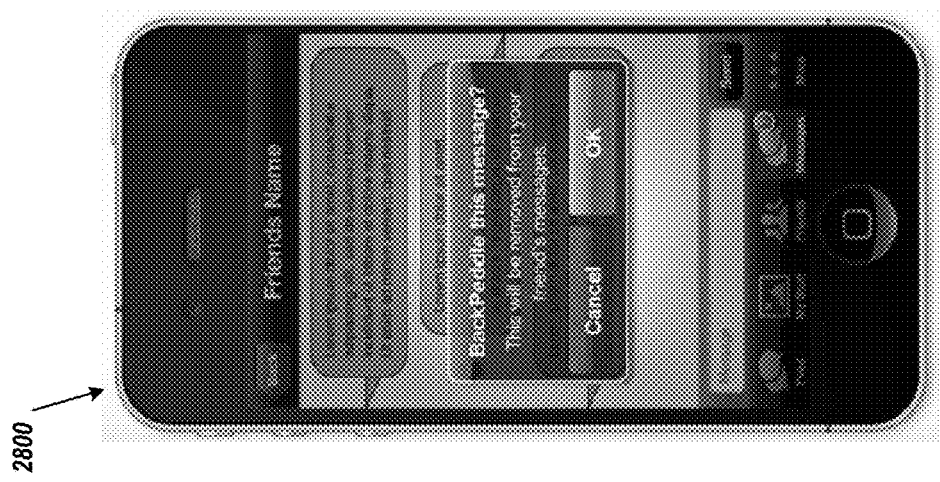
Figure 27:
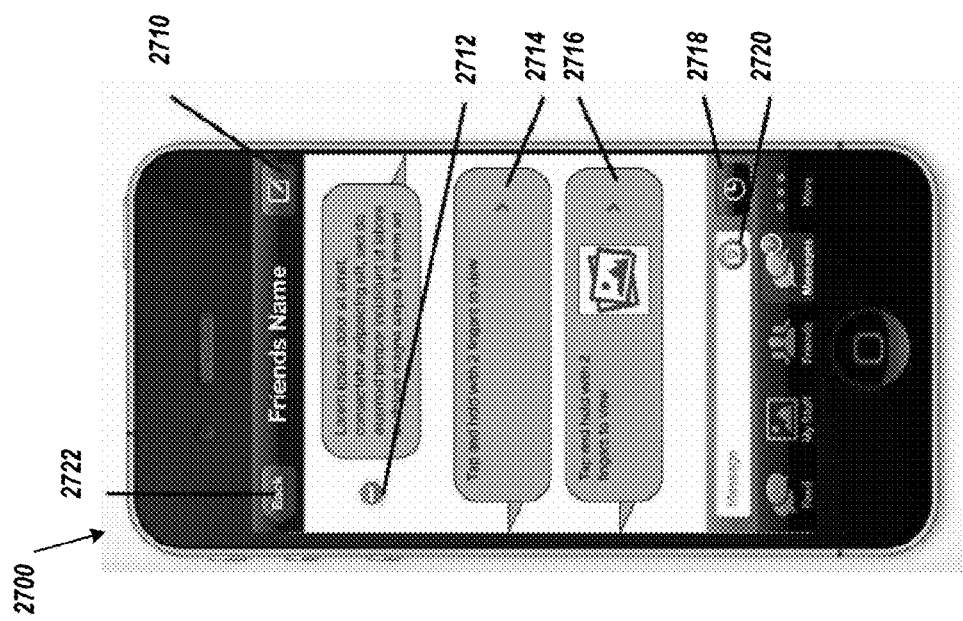
Figure 34:
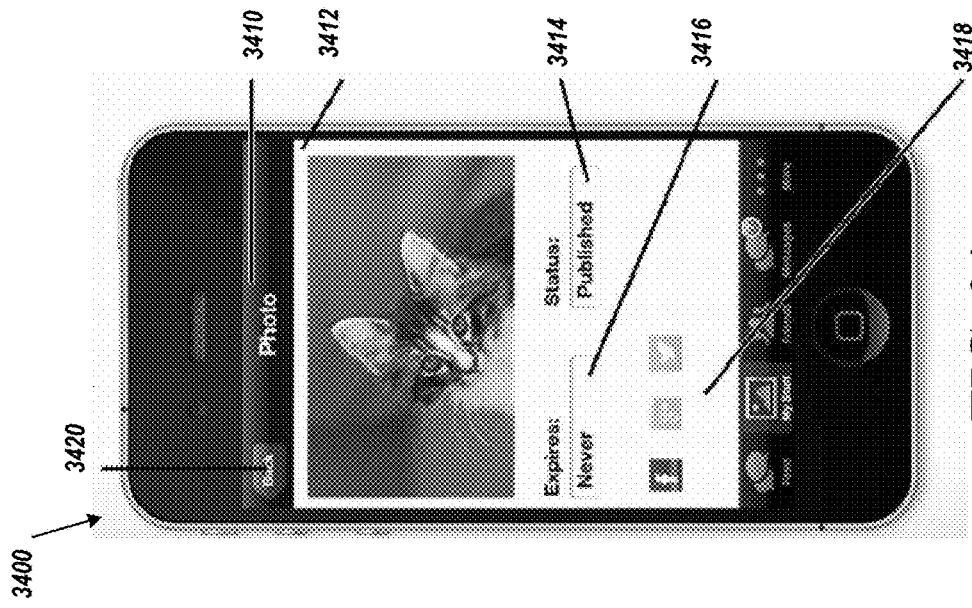
Figure 33:
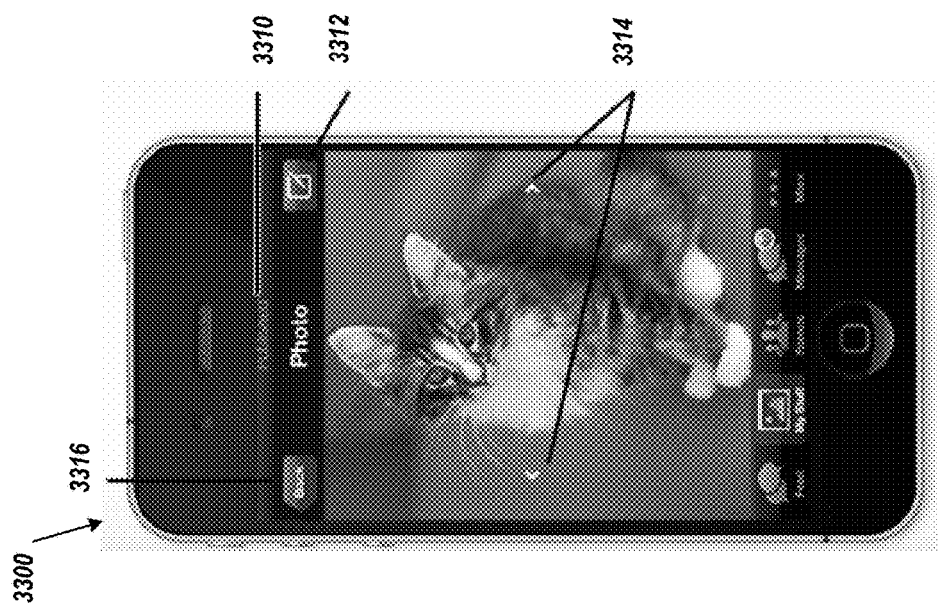
Figures 35, 36:
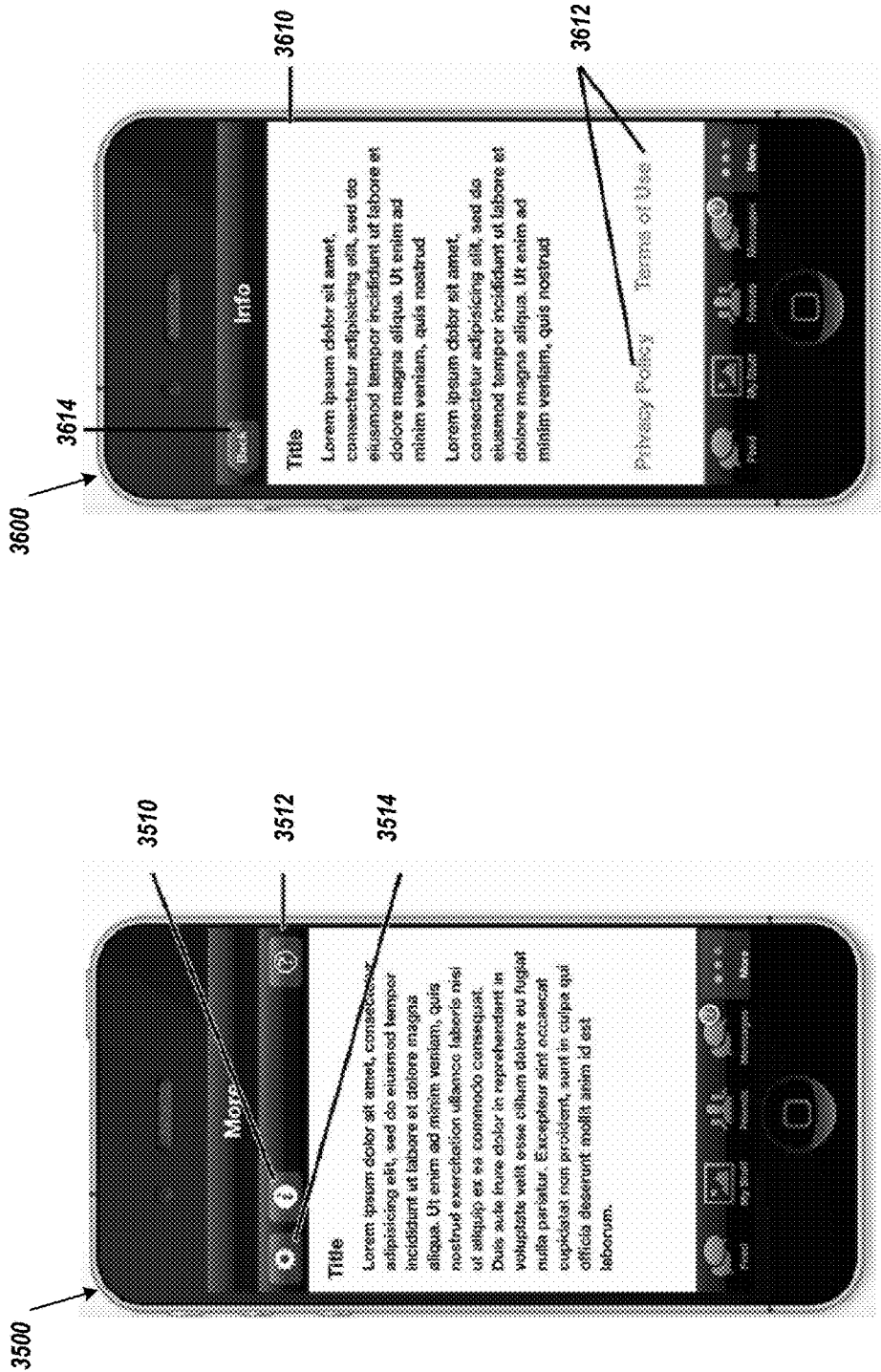
Figure 42:
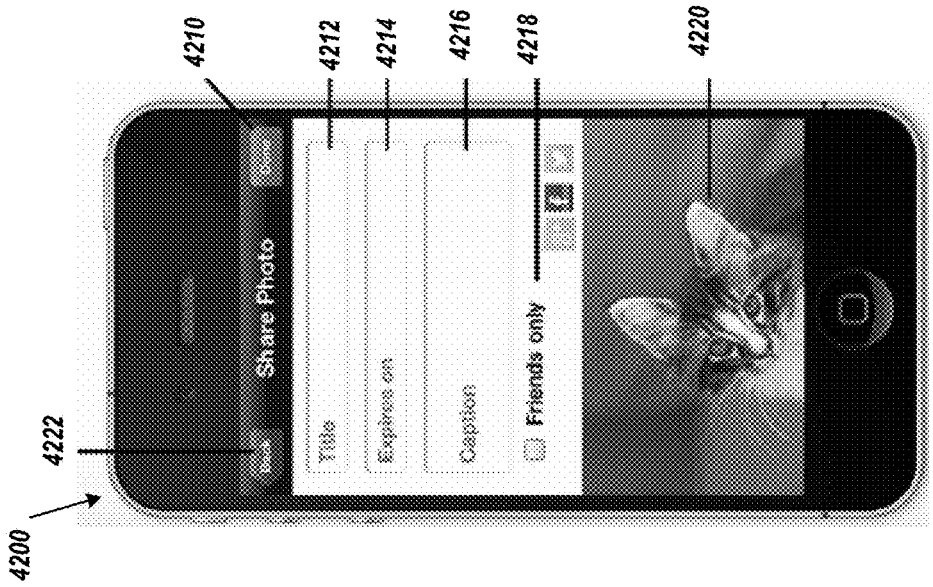
Figure 41:
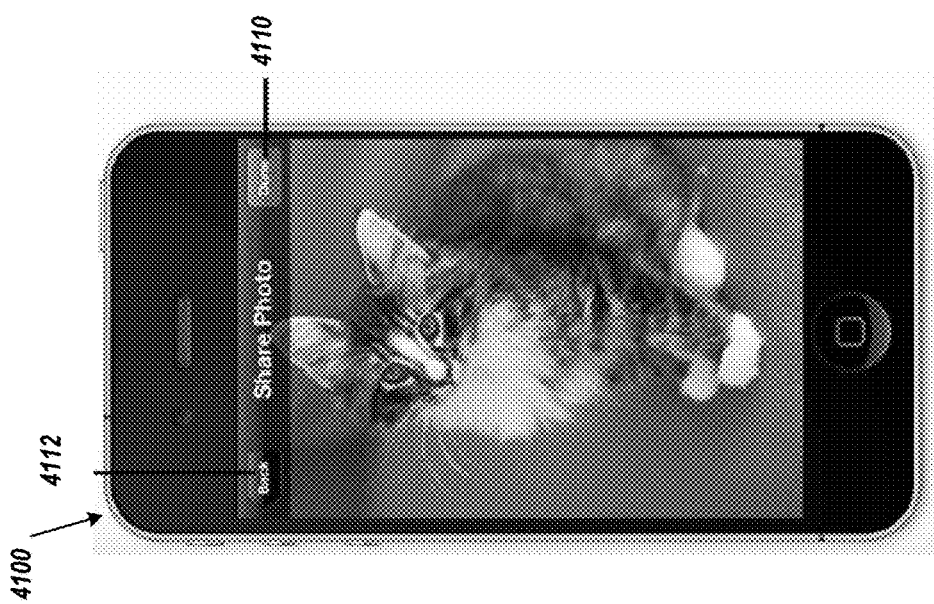

FIGS. 26-28 illustrate example screen shots relating to the method 800 described above in regard to FIG. 8 for sending and receiving messages through the content sharing system 100. A user may perform actions including, but not limited to: viewing friends screen (2610), viewing message screen (2612), viewing application controls (2710), prompting user for confirmation (2712), viewing message (2714, 2716), setting expiration time (2718), attaching additional content (2720), and taking a picture (2614, 2722). Other embodiments may include additional options or may omit certain options shown herein.

FIGS. 29-30 illustrate example screen shots relating to the method 700 described above in regard to FIGS. 7A-7C for inviting friends to join BackPeddle. A user may perform actions including, but not limited to viewing invite screen (2910), ignoring a friend request (3010), rejecting a friend request (3012), accepting a friend request (3014), taking a picture (2914), and navigating the process (3016). Other embodiments may include additional options or may omit certain options shown herein.

FIGS. 31-34 illustrate example screen shots relating to maintenance of profile information stored for a user in the database 226 of the content sharing system 100. A user may perform actions including, but not limited to: initiating a new message (3110), prompting a dialog for flagging username as inappropriate (3112), viewing friends' screen (3114), sorting (3116), filtering content by type (3118), viewing full photo or video (3120), displaying BackPeddle status (3210, 3310, 3410), browsing content (3314, 3414), and navigating the process (3122, 3212, 3214, 3312, 3316, 3412 3420). Other embodiments may include additional options or may omit certain options shown herein.

FIGS. 35-38 illustrate example screen shots relating to the method 900 described above in regard to FIG. 9 for viewing additional content relating to the content sharing system 100. A user may perform actions including, but not limited to: navigating the information (3510, 3512, 3514, 3610, 3612, 3614, 3710, 3712, 3814) and submitting feedback (3810, 3812). Other embodiments may include additional options or may omit certain options shown herein.

FIG. 39 illustrates an example screen shot relating to maintenance of application settings of the BackPeddle application, according to embodiments of the present disclosure. A user may perform actions including, but not limited to: enabling social service for user, which may prompt for authorization (3910); selecting whether to share published content to enabled services (3912); and navigating the process (3914, 2916). Other embodiments may include additional options or may omit certain options shown herein.

FIGS. 40-45 illustrate example screen shots relating to sharing of content in the content sharing system 100, including photos and videos, according to embodiments of the present disclosure. A user may perform actions including, but not limited to: selecting content (4010, 4310), publishing the content (4210, 5410), entering a title (4212, 4512), entering an expiration date (4214, 4514), entering a caption about the content (4216, 4515), setting a publication privacy setting (4218, 4516), displaying the image (4220, 4518), playing a video (4412), and navigating the process (4012, 4110, 4112, 4222, 4312, 4410, 4414, 4520).

FIG. 46 illustrates an example screen shot relating to content expiring, according to embodiments of the present disclosure.

Figure 48:
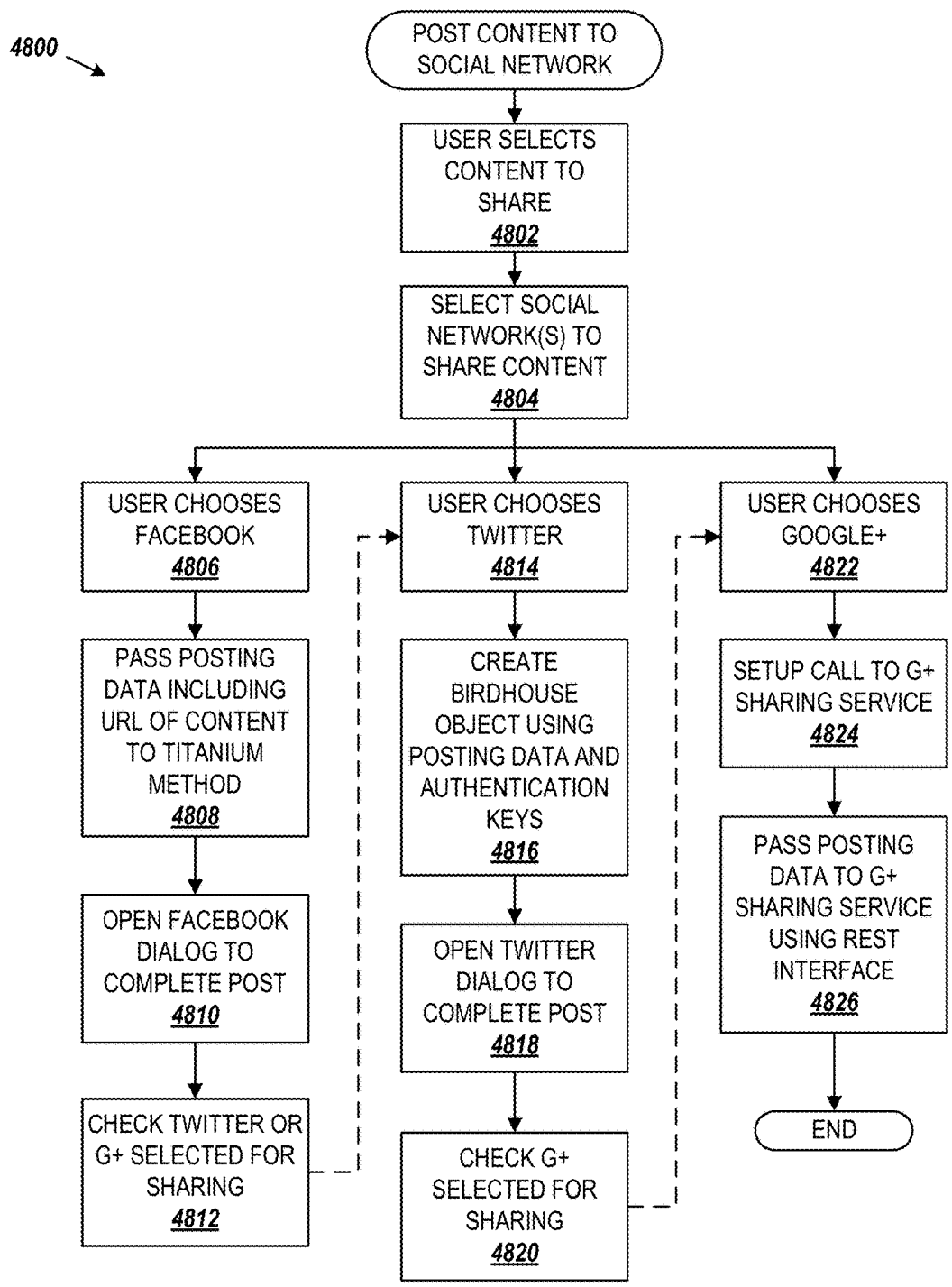
FIG. 48 is a flow diagram illustrating one method for sharing or "posting" of content to supported social networks, according to some embodiments of the present disclosure.

FIG. 48 shows one example of a method 4800 for sharing or "posting" of content to supported social networks 116, 118, according to embodiments of the present disclosure. According to some embodiments, the method 4800 may be implemented by the client app 221 executing on a user device 110, 112, 114. The client app 221 may be implemented on a mobile app development platform, such as the TITANIUM™ mobile development environment from Appcelerator Inc. of Atlanta, Ga. The mobile app development platform may provide methods for accomplishing common mobile application tasks, such as posting data to social networks 116, 118, such as Facebook. In further embodiments, additional open-source libraries may be used for posting to social networks 116, 118. For example, a Twitter library for Titanium, referred to as "Birdhouse," may be used for sharing content to Twitter. In further embodiments, posting of the to the social networks 116, 118 may be performed through the social network interface program 224 executing on the content sharing server 120 described above in regard to FIG. 2.

As described above in regard to FIG. 6, the user of the client app 221 may create or select content to be shared, as shown at 4802. The content to be shared may comprise text, images, video, or the like. The content may then be submitted to the content sharing program 222 through the backend API and stored on the content sharing server 120. The user may then select the social network(s) with which to share the selected content (4804). For example, the client app 221 may present the user with options from which to choose, such as Facebook, Twitter and Google+. At 4806, if Facebook is chosen, default captioning data, an URL that links to the content stored on the content sharing server 120, and iconography image representing the content sharing system 100 are passed to a native Titanium posting function, as shown at 4808. The posting function may display a standard Facebook share post modal window that allows the user to edit captioning data and send the post to their Facebook wall (4810). On success, error, or cancellation of the posting function, a status may be displayed using a native device popup on the user device 110, 112, 114. At 4812, the client app 221 then checks to see if other social networks 116, 118 have been selected for sharing.

At 4814, if Twitter is chosen, the client app 221 may create a custom Twitter object through the Birdhouse library. One or more authentication values for the object are set (4816), such as the consumer_key generated when the user was authenticated by Twitter, if available, the consumer_secret authentication token for authentication to Twitter, if available. The Birdhouse tweet method may then be called is called, passing default captioning data and the URL that links to the content stored on the content sharing server 120. The tweet method may open a Twitter dialog on the user device 110, 112, 114 allowing the user to complete the post (4818). The method 4800 then checks whether additional social networks 116, 118 have been selected for sharing, as shown at 4820.

At 4822, if f Google+ is chosen, a call to the Google+ sharing service may be setup using Titanium methods (4824). The Google+ sharing service may provide a REST interface for posting content. The call to the Google+ sharing service may include the following information:

The base URI for the RESTful call (e.g. https://plus.google.com/share)
Parameters:
   Client_id—registered application id of the client app 221 (the BackPeddle app)
   Continue—authentication token (if available) and instructions to share
   Text—default sharing text or default captioning data
   URL—URL that links to the content stored on the content sharing server 120
   Bundle_id—authentication token (again)

At 4826, the call to the Google+ sharing service is made by invoking a Titanium method to make a web RESTful call with the posting data in order to share the content.

Figure 49:
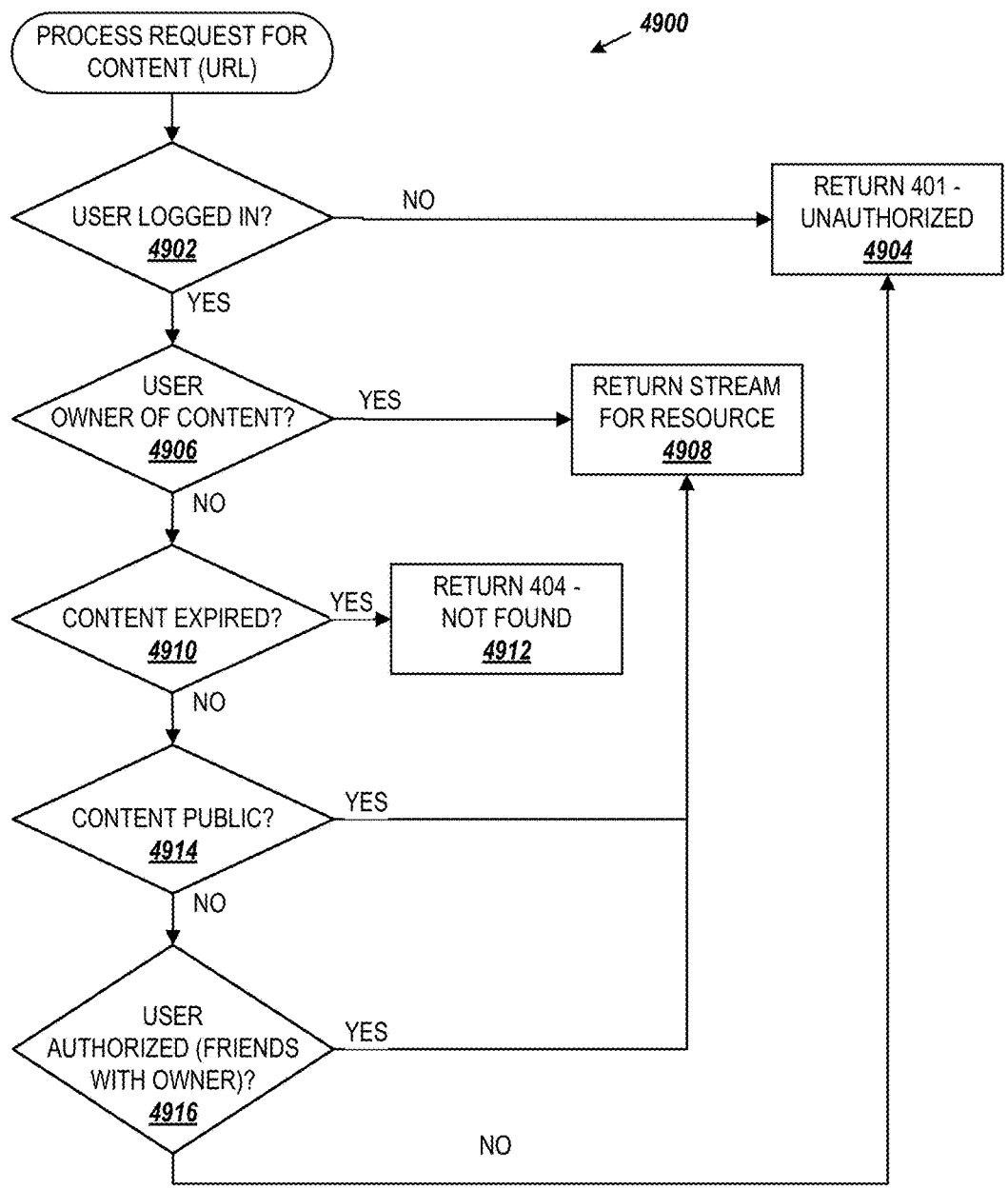
FIG. 49 is a flow diagram illustrating one method for providing shared content to a user in response to a user clicking an associated link on a social network, according to some embodiments of the present disclosure.

FIG. 49 shows one example of a method 4900 for providing shared content to a user in response to a user clicking an associated link on a social network 116, 118, according to embodiments of the present disclosure. According to some embodiments, the method 4900 may be performed by the social network interface program 224, the content sharing program 222, and/or other software components when a resource (content) is requested from the content sharing server 120 by URL. In some embodiments, the user must be logged into the content sharing system 100 with a valid API key to access the resource (4902). If not, the social network interface program 224 issues a "401—Unauthorized" HTTP response to the URL request (4904). If the user referenced in the API key is the owner of the content, expiry date and other checks are bypassed, as shown at 4906. This check may be performed by comparing the owner's user id with the user id of the requester. In response to a request received from the owner of the content, the social network interface program 224 streams the resource to the requesting user using the appropriate mime type in response to the URL request (4908).

For non-owners, the social network interface program 224 checks to see if the content has expired or has been backpeddled (4910) based on the sharing parameters associated with the content. For example, the expiration date recorded in the database 226 for the content may be compared to the current system time and/or the BackPeddle status flag may be checked to see if it has been set. If the content has expired or has been backpeddled, the content sharing program 222 may return a 404—Not Found HTTP response to the URL request (4912). If the content has not expired, the social network interface program 224 checks if the content is marked with a public status (4914). This may be based on a sharing parameter comprising a flag associated with the content (resource) in the database 226. If this flag is set to "true," then the social network interface program 224 streams the resource to the requesting user using the appropriate mime type in response to the URL request (4908). If the content is not public, the social network interface program 224 checks for friend association between the requesting user and the owner (4916). Friendship may be indicated through an association of two user ids in a cross-reference table of the database 226, for example. If the friend association exists, the social network interface program 224 streams the resource to the requesting user using the appropriate mime type in response to the URL request (4908). Otherwise, the social network interface program 224 issues a "401—Unauthorized" HTTP response to the URL request (4904).

Figure 52:
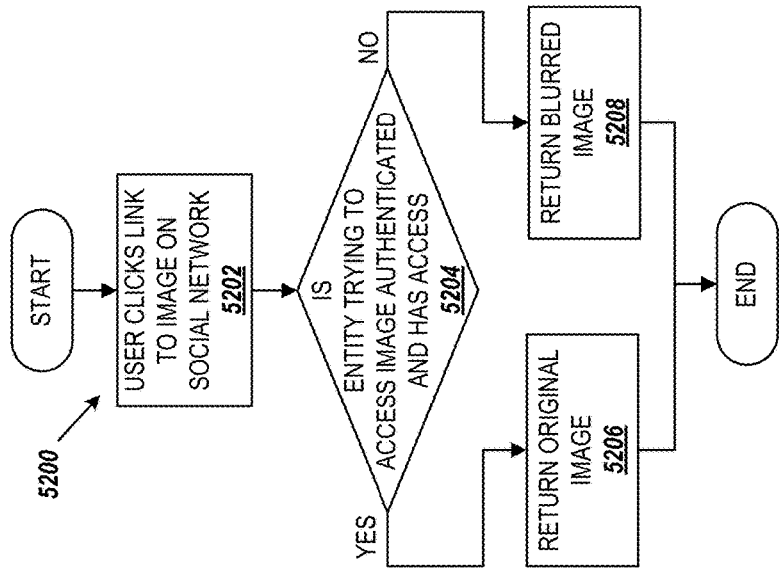
FIGS. 50-52 are flow diagrams illustrating aspects of utilizing blurred images for sharing images on social media sites or other image sharing websites, according to some embodiments of the present disclosure.
Figure 51:
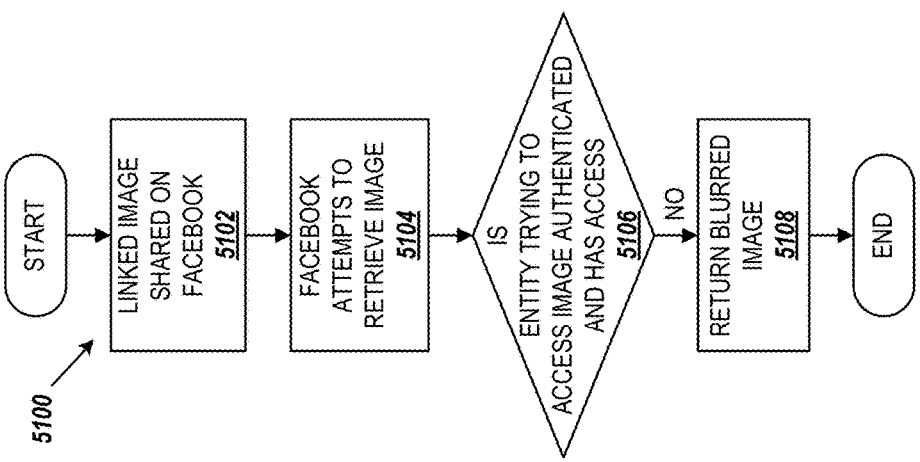
Figure 50:
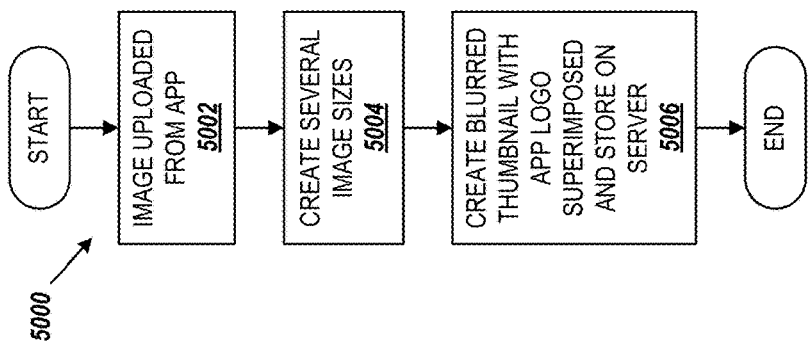

FIGS. 50-52 illustrate aspects of utilizing blurred images for sharing images on social networks 116, 118, such as Facebook, or other websites that may cache or otherwise make copies or thumbnails of images (content) shared on the networks, according to some embodiments. Specifically, FIG. 50 shows one method 5000 for creating a blurred image to be associated with shared content, according to embodiments. According to some embodiments, the method 5000 may be performed by the social network interface program 224, the content sharing program 222, and/or other software components when an image (content) is presented to the content sharing server 120 through the backend API for sharing with one or more social networks 116. 118.

When an image is uploaded by the BackPeddle application to the content sharing server 120 for sharing on one or more social networks 116, 118 (5002), several copies of the image may be made for differing display contexts (e.g. mobile thumbnails, mobile view, web view) (5004). For the thumbnails that are created to share to Facebook, for example, the images may be blurred with a logo superimposed on them (5006) using the any blurring/image processing methods known in the art. These images may be stored on the content sharing server 120 and associated with the content using a unique id number and directory and their purpose within the app may be designated by a suffix in the file name. By way of example, for an uploaded image to be shared called 1234567.jpg:

1234567.jpg would be the original file
1234567_70x70.jpg would the small thumbnail version of the image (for The World feed)
1234567_social.jpg would the blurred thumbnail version of the image for social network sharing FIG. 51 shows one method 5100 for sharing of an image on Facebook or other social networking or image sharing website, according to embodiments. According to some embodiments, the method 5100 may be performed by the social network interface program 224, the content sharing program 222, and/or other software components when a shared image (content) is requested from the content sharing server 120. As described above in regard to FIG. 49, when the image is shared to Facebook through the BackPeddle application (5102), Facebook attempts to find the image on the web page and make a thumbnail copy of it that is cropped to Facebook's site specifications (5104). This is image is cached in Facebook's Content Delivery Network (CDN). On the content sharing server 120, all requests to retrieve content (images) are checked to see if the user is authenticated and has access to the image, as shown at 5106. If the accessing user is not authenticated or does not have rights to access the image, the blurred image associated with the content created at 5006 above (suffixed with "_social") may be retrieved by the content sharing server 120 and returned in response to the request. As the call to add the image to Facebook's CDN is coming from an anonymous user, the call is neither authenticated nor is access granted, so the blurred image is returned and added to Facebook's CDN (5108). In other embodiments, the social network interface program 224 or content sharing program 222 may use meta tags associated with the content to tell Facebook to load the blurred image instead of the actual content on the social page.

FIG. 52 shows one method 5200 for viewing a shared image on Facebook or other social networking or image sharing website, according to embodiments. According to some embodiments, the method 5200 may be performed by the social network interface program 224, the content sharing program 222, and/or other software components when a shared image (content) is requested from the content sharing server 120. Similarly to the method outlined above in regard to FIG. 51, when a user clicks a link on a social website linked to content stored in the content sharing system 100 (5202), the content sharing server 120 checks to see if the requesting user is authenticated and has access to the image (5204). If they user is not authenticated or does not have access, the blurred, branded image is displayed (5208). If the user does have access, the full image is displayed (5206).

Other embodiments may include additional options or may omit certain options shown herein. One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method of controlling access to content through a social network, comprising:
    receiving, by a first computer system, a first request from a first user of the social network to share content on the social network, the first request comprising a content item and at least one sharing parameter, the at least one sharing parameter comprising information for determining whether or not the content item will be made available for other users of the social network to view when a request to view the shared content is received from the social network;
    storing in the first computer system the content item and the at least one sharing parameter associated with the content item;
    sending, by the first computer system, a command to a second computer system executing the social network on behalf of the first user to cause the content item to be published to a profile related to the first user on the social network, the command comprising an URL indicating the first computer system as the source of the content item;
    receiving, by the first computer system, a second request from the second computer system to retrieve the content item, the second request resulting from a second user of the social network selecting the URL;
    in response to receiving the second request, retrieving, by the first computer system, the at least one sharing parameter associated with the content item;
    determining, by the first computer system, whether the content item is authorized for viewing by the second user based on a context of the second request and the at least one sharing parameter associated with the content item stored in the first computer system, the at least one sharing parameter comprising a backpeddle status indicating whether the content item has been unpublished by the first user at a time subsequent to the first request;
    upon determining that the content item has been unpublished by the first user based on the backpeddle status, returning, by the first computer system, a branded image indicating the content has been backpeddled in lieu of the content item in response to the second request; and
    upon determining that the content item is authorized for viewing by the second user, returning, by the first computer system, the content item in response to the second request.

2. The method of claim 1, wherein the at least one sharing parameter further comprises an expiration date indicating a date and time of expiration of access to the content item and wherein determining whether the content item is authorized for viewing comprises determining whether the expiration date has expired.

3. The method of claim 1, further comprising:
    upon determining that the content item is not authorized for viewing, returning an error in response to the second request.

4. The method of claim 1, wherein the second request further comprises an identifier of the second user and wherein determining whether the content item is authorized for viewing further comprises determining, by the first computer system, whether a relationship exists between the first user and the second user of the social network, data indicating any relationship between the first user and the second user being stored in the first computer system.

5. The method of claim 1, wherein the content item comprises an image and wherein the method further comprises:
    upon receiving the first request, generating a blurred image from the content item;
    storing the blurred image associated with the content item in the first computer system; and
    upon determining that the second user is not authorized for viewing of the content item, returning the blurred image in response to the second request.

6. The method of claim 1, further comprising:
    receiving, by the first computer system, user credentials for the social network associated with the first user to authenticate the first user as a registered user of the social network in conjunction with the command.

7. The method of claim 1, wherein determining whether the content item is authorized for viewing comprises:
    determining, by the first computer system, whether the second user is an owner of the content item;
    upon determining that the second user is the owner of the content item, returning the content item in response to the second request;
    upon determining that the second user is not the owner of the content item, determining, by the first computer system, whether access to the content item has expired or whether the content item has been backpeddled based on the at least one sharing parameter associated with the content item stored in the first computer system;
    upon determining that the access to the content item has expired or that the content item has been backpeddled, returning an error in response to the second request;
    upon determining that the access to the content item has not expired and that the content item has not been backpeddled, determining, by the first computer system, whether the content item is marked with a public status based on the at least one sharing parameter associated with the content item stored in the first computer system;
    upon determining that the content item is marked with a public status, returning the content item in response to the second request;
    upon determining that the content item is not marked with a public status, determining, by the first computer system, whether the second user a has a relationship with the owner of the content item, data indicating any relationship between the second user and the owner of the content item being stored in the first computer system;
    upon determining that the second user has a relationship with the owner of the content item, returning the content item in response to the second request; and
    upon determining that the second user does not have a relationship with the owner of the content item, returning an error in response to the second request.

8. The method of claim 1, wherein the social network is selected from the group consisting of Facebook, Twitter, and Google+.

9. A non-transitory computer-readable storage medium comprising computer-executable instructions that, when executed by a first computer system, cause the first computer system to:
    receive a request from a second computer system executing a social network to retrieve content shared to the social network by an owner of the content, the owner of the content being a user of the social network, the request resulting from a second user of the social network selecting an URL associated with the content on the social network, the content being stored in the first computer system;

in response to receiving the request from the second computer system, determine whether the content is authorized for viewing by the second user based on a sharing parameter associated with the content indicating whether the content has been unpublished by the owner, the sharing parameter associated with the content specified by the owner of the content at a time subsequent to the time of sharing the content to the social network, the sharing parameter associated with the content being stored in the first computer system;

upon determining that the sharing parameter associated with the content does not indicate that the content has been unpublished by the user, returning the content to the second computer system in response to the request; and upon determining that the sharing parameter associated with the content does indicate that the content has been unpublished by the user, returning a branded image indicating the content has been backpeddled to the second computer system in response to the request in lieu of the content.

10. The non-transitory computer-readable storage medium of claim 9, wherein the request further comprises an identifier of the second user and wherein determining whether the content is authorized for viewing by the second user further comprises determining whether a relationship exists between the second user and the owner of the content, data indicating any relationship between the second user and the owner of the content being stored in the first computer system.

11. The non-transitory computer-readable storage medium of claim 10, having further computer-executable instructions stored thereon that cause the first computer system to:

upon determining that no relationship exists between the second user and the owner of the content, returning a blurred image associated with the content to the second computer system in response to the request, the blurred image associated with the content stored in the first computer system.

12. A system for sharing content, the system comprising: one or more processors; and a memory coupled to the one or more processors, wherein the memory stores executable instructions for causing the processors to receive a first request from an owner of a content item to share content to a social network, the first request comprising the content item and a sharing parameter associated with the content item, the sharing parameter associated with the content item comprising information for determining whether or not the content item will be made available for users of the social network to view when a request to view the shared content is received from the social network, store the content item and the sharing parameter associated with the content item in the memory, send a command to a second computer system executing the social network to cause the content item to be published to a profile related to the owner on the social network, the command comprising an URL indicating the system as the source of the content item, receive a second request from the second computer system to retrieve the content item, the second request resulting from a user of the social network selecting the URL, in response to receiving the second request, retrieve the sharing parameter associated with the content item from the memory, determine whether the content item has been backpeddled by the owner of the content item based on the sharing parameter associated with the content item, upon determining that the content item has been backpeddled, return a branded image indicating the content item has been backpeddled to the second computer system in response to the request in lieu of the content item.

13. The system of claim 12, wherein the memory stores further executable instructions for causing the processors to:

upon determining that the content item has not been backpeddled, determine whether the user of the social network associated with the second request is the owner of the content item;

upon determining that the user of the social network is the owner of the content item, return the content item to the second computer system in response to the second request;

upon determining that the user of the social network is not the owner of the content item, determine whether the content item is marked with a public status based on the sharing parameter associated with the content item;

upon determining that the content item is marked with a public status, return the content item to the second computer system in response to the second request;

upon determining that the content item is not marked with a public status, determine whether the user of the social network a has a relationship with the owner of the content item, data indicating any relationship between the user of the social network and the owner of the content item being stored in the memory; and upon determining that the user of the social network has a relationship with the owner of the content item, return the content item to the second computer system in response to the second request.

14. The system of claim 12, wherein the first request further comprises a specification of a plurality of social networks to which to share the content, a command being sent to a different computer system associated with each of the plurality of social networks to cause the content item to be published to a profile related to the owner.

15. The system of claim 12, wherein the memory stores further executable instructions for causing the processors to:

receive user credentials associated with the owner to authenticate the owner as a registered user of the social network in conjunction with the command.

16. The system of claim 13, wherein the content item comprises an image and wherein the memory stores further executable instructions for causing the processors to:

upon receiving the first request, generate a blurred image from the content item;

store the blurred image associated with the content item in the memory; and upon determining that the user of the social network does not have a relationship with the owner of the content item, return the blurred image in response to the second request.

\* \* \* \* \*